United States Patent
Sugaya

(10) Patent No.: US 7,356,353 B2
(45) Date of Patent: Apr. 8, 2008

(54) WIRELESS COMMUNICATION DEVICE, WIRELESS COMMUNICATION METHOD, AND WIRELESS COMMUNICATION SYSTEM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 909 days.

(21) Appl. No.: 10/674,505

(22) Filed: Oct. 1, 2003

(65) Prior Publication Data

US 2004/0132481 A1    Jul. 8, 2004

(30) Foreign Application Priority Data

Oct. 10, 2002  (JP)  ............................. 2002-297810
Oct. 10, 2002  (JP)  ............................. 2002-297811

(51) Int. Cl.
*H04B 1/38*  (2006.01)
*H04M 1/00*  (2006.01)

(52) U.S. Cl. .................... 455/557; 455/558; 455/435.1; 455/563; 455/556.1; 455/566; 330/149

(58) Field of Classification Search ................ 455/558, 455/557, 556.1, 563, 566, 357.01, 435.1, 455/73; 454/563

See application file for complete search history.

(56) References Cited

U.S. PATENT DOCUMENTS 5,371,553 A * 12/1994 Kawamura et al. ............ 725/59
5,640,301 A *  6/1997 Roecker et al. ............. 361/686
5,742,905 A *  4/1998 Pepe et al. .................. 455/461
5,983,004 A * 11/1999 Shaw et al. .................. 709/227
6,078,661 A *  6/2000 Arnett et al. ........... 379/413.04
6,101,403 A *  8/2000 Masuda .................... 455/569.2
6,188,429 B1 *  2/2001 Martin et al. ............. 348/14.08
6,359,636 B1 *  3/2002 Schindler et al. ............ 715/846
6,418,324 B1 *  7/2002 Doviak et al. ............ 455/426.1
6,879,348 B1 *  4/2005 Niida .......................... 348/552
6,940,562 B2 *  9/2005 Sato ............................ 348/734
7,110,744 B2 *  9/2006 Freeny, Jr. .................. 455/406
7,158,776 B1 *  1/2007 Estes et al. .................. 455/411

FOREIGN PATENT DOCUMENTS

| JP | 09-182161 | 7/1997 |
|----|-----------|--------|
| JP | 10-107886 | 4/1998 |
| JP | 2001-217846 | 8/2001 |
| JP | 2003-101554 | 4/2003 |

* cited by examiner

*Primary Examiner*—Marceau Milord
(74) *Attorney, Agent, or Firm*—Oblon, Spivak, McClelland, Maier & Neustadt, P.C.

(57) ABSTRACT

A wireless communication device and wireless communication method, which can perform wireless transmission switching through simple input/output switching in communication among a plurality of wireless communication devices, are provided. A wireless communication device includes interfaces 31-1, 31-2, 31-3 which connect to equipment having a plurality of input/output terminals, an information storage portion 36 which exchanges information with other wireless communication devices and stores information on equipment connected to each of the input/output terminals, and a wireless communication portion 35 and wireless reception portion 37 which transmit and receive information on equipment connected to switched input/output terminals according to input/output switching operations of equipment having a plurality of input/output terminals; information on equipment connected to each input/output terminal is managed in association with other wireless communication devices, and information on equipment connected to each input/output terminal is transmitted and received according to input/output switching of equipment having a plurality of input/output terminals.

10 Claims, 16 Drawing Sheets

FIG. 16

| 161 | 162 | 163 | 164 | 165 |
|---|---|---|---|---|
| Existence Notification Command Identifier | Transmission origin Address (Self-Referencing Device Information) | Reception Destination Address (None) | Input/Output Link Information Distinction | Error Detection Code |

FIG. 17

| 171 | 172 | 173 | 174 | 175 |
|---|---|---|---|---|
| Registration Request Command Identifier | Transmission origin Address (Self-Referencing Device Information) | Reception Destination Address (Target Device Information) | Input/Output Link Information Distinction | Error Detection Code |

FIG. 18

| 181 | 182 | 183 | 184 | 185 |
|---|---|---|---|---|
| Registration Notification Command Identifier | Transmission origin Address (Self-Referencing Device Information) | Reception Destination Address (Target Device Information) | Input/Output Link Information Distinction | Error Detection Code |

FIG. 19

| 191 | 192 | 193 | 194 | 195 |
|---|---|---|---|---|
| Registration Notification+Encoding Information Command Identifier | Transmission origin Address (Self-Referencing Device Information) | Reception Destination Address (Target Device Information) | Input/Output Link Information Distinction | Encoding Object Identifier |

| 196 | 197 |
|---|---|
| Encoding Information | Error Detection Code |

WIRELESS COMMUNICATION DEVICE, WIRELESS COMMUNICATION METHOD, AND WIRELESS COMMUNICATION SYSTEM

BACKGROUND OF THE INVENTION

1. Field of the Invention

This invention relates to a wireless communication device which, for example, constitutes a network among a plurality of wireless communication devices.

2. Description of the Related Art

In recent years, a method of connecting wireless communication devices to personal computers or similar equipment and constructing a wireless local area network (LAN) among a plurality of personal computers has been widely known as one method of connecting a plurality of personal computers as a LAN.

In such a wireless LAN of the prior art, in order to recognize the wireless communication devices and equipment connected to the wireless network, a method has conventionally been employed in which the equipment units actually connected are displayed on a monitor of personal computers and similar that are connected to the network to enable users to visually verify the equipment.

In other words, a method has been used in which, when transferring data of some kind to equipment connected to the wireless network, the equipment connected to the network is verified on the monitor of the personal computer or similar of the apparatus that is the sender of the information, the destination equipment is specified, and the information is transferred.

On the other hand, recently there have been increases in the transmission capacities of wireless LANs, and methods are being considered in which audio and video equipment (hereafter "AV equipment") is incorporated into wireless networks for wireless transmission.

In the past, there has been widely used a video transmission method of AV equipment, in which the output terminals of such equipment and the input terminals of monitor apparatuses are connected by connecting cords, and by switching the input of the monitor apparatus, desired video information is displayed.

Further, methods are being considered for the exchange of data by constructing, in a communication area over shorter distances than such a wireless LAN, personal area networks (PANs) centered on portable devices and equipment owned by an individual.

In such a PAN, it is assumed that in addition to a personal computer, consumer equipment such as a camcorder, a VCR (videocassette recorder) apparatus, and a monitor will also be incorporated in the network.

In such a wireless PAN, the exchange of authentication information in advance between devices has been required in order to recognize the wireless communication devices and equipment connected to the wireless network.

For example, in a wireless PAN conforming to the IEEE 802.15.3 communication standard, an operation that is called "authentication" is stipulated, and a device which has executed "association" with the PAN is supposed to exchange encoded information and other device link information with other devices.

As the method of exchanging device link information, a method is conventionally employed in which information is exchanged as one link in both directions between the two devices.

An application previously filed by this applicant is Japanese Patent Application No. 2001-289763. According to this prior application, in order to effect peer-to-peer operation between a transmission device and a receiving device, a transmission device identification number (ID) is registered in advance with the receiving device.

However, when AV equipment is connected to a conventional wireless network as described above, there is a disadvantage that some kind of monitor device or other display functions must be added to the AV equipment from which information is to be sent, in order to specify the monitor device which is to be the destination.

In order to resolve the above disadvantage, there has been required such complicated processing as: equipment connected to the wireless network is displayed on a monitor device side, and based on this display a user selects a device whose monitor performs display; and thereafter information is transmitted to the device.

In a conventional video transmission method using AV equipment, input switching on the monitor device side can be performed simultaneously with display of information input to the device terminals, so that the user need not perform complicated operations; however, when wireless transmission over a wireless LAN is performed, the above-described complex input selection processing is required, and so there is an inconvenience for a user.

Further, in conventional authentication operations, if processing is not performed between devices on which the same application is installed, exchange of the device link information necessary for such communications is not possible, and so there is the problem that data cannot be exchanged.

That is, when data is transmitted and received between connected devices the applications of which are different, it is not possible for either device to judge what kind of data is being sent, and so there is the problem that data transmission itself is useless.

Moreover, if device link information cannot be exchanged between devices intended for communication by the user, there is a possibility that an ill-intended device may be incorporated into the wireless network and may disseminate personal information to an unauthorized device.

Consequently there is the disadvantage that this authentication operation requires the exchange of device link information only by devices approved by a wireless network user with devices associated with the wireless network.

In a wireless PAN conforming to the IEEE 802.15.3 communication standard, during standardized authentication operations, an operation is required in which the wireless communication devices for which authentication operation is to be initiated are specified.

Further, in conventional authentication operations, emphasis was placed mainly on the construction of wireless networks between computer systems, so that authentication has been performed by devices which input and output data exchanged between applications, without particular consideration paid to the direction in which data is sent.

Consequently if authentication operation with an ill-intended device succeeds, and the device is incorporated into the network, there is the problem that content not intended for dissemination by the user may easily be disseminated or viewed by others.

There is the further problem that a computer virus or other ill-intended content can be sent into the network.

This invention was devised in light of these problems, and an object of the present invention is to provide a wireless communication device and wireless communication method which, through a simplified input/output switching operation, can switch wireless transmission between a plurality of wireless communication devices.

For example, one object is to realize a method to obtain desired information from a wireless transmission channel through simple input switching operations by a user, with respect to a plurality of equipment units connected to monitor devices.

Further, in light of the above problems, this invention has as an object of providing wireless communication devices which constitute a secure wireless network by exchanging device link information between devices operating the same application intended by users.

A further object is to provide a wireless communication method of exchanging device link information between devices intended by users through simple operations.

Another object is to provide a wireless communication method with which, even when an ill-intended device is authenticated by the network, content that is not intended to be disseminated by a user cannot easily be extracted.

SUMMARY OF THE INVENTION

A wireless communication device according to the present invention includes interface means, which connects equipment having a plurality of input/output terminals; connection information exchange means, which exchanges, with another wireless communication device, information on equipment connected to each of the input/output terminals; storage means, which stores information on equipment connected to each of the input/output terminals; and information transmission/reception means, which transmits and receives information on equipment connected to switched input/output terminals, according to input/output switching operations of equipment having a plurality of input/output terminals; the wireless communication device manages information on equipment connected to each of the input/output terminals in association with other wireless communication devices, and transmits and receives information on equipment connected to each of the input/output terminals according to input/output switching operations of equipment having a plurality of input/output terminals.

Hence according to the present invention, the following operations are performed.

Wireless communication devices connected to a equipment linked with each of input/output terminals are registered in advance in the wireless communication device connected to the equipment having the plurality of input/output terminals, and by input/output switching of the equipment having a plurality of input/output terminals, information is received from registered wireless communication devices connected to the equipment, and information is transmitted to registered wireless communication devices connected to the equipment.

Further, a wireless communication method of this invention includes an input/output switching step for switching the input and output of equipment having a plurality of input/output terminals; a utilization notification step for notifying a selected wireless communication device of the utilization of input/output terminals and requesting information; and a transmission step for transmitting information on equipment connected to each of the input/output terminals, according to a request for information in a utilization notification; in the wireless communication method, information on equipment connected to each of the input/output terminals is managed in association with other wireless communication devices, and information on equipment connected to each of the input/output terminals is transmitted and received according to input/output switching of equipment having a plurality of input/output terminals.

Hence according to the present invention, the following operations are performed.

Wireless communication devices connected to the equipment linked with each of the input/output terminals are registered in advance in the wireless communication device connected to the equipment having the plurality of input/output terminals, and by notifying a selected wireless communication device of the utilization of input/output terminals and requesting information according to input/output switching of the equipment having a plurality of input/output terminals, and transmitting information on equipment connected to each of the input/output terminals according to a request for information in a utilization notification, information is received from a wireless communication device connected to the registered equipment and is transmitted to a wireless communication device connected to the registered equipment.

Further, a wireless communication method of the present invention includes an input/output switching step for switching the input and output of equipment having a plurality of input/output terminals; a bandwidth acquisition request step for requesting acquisition of a predetermined wireless transmission channel in order to perform wireless communication; a bandwidth utilization notification step for returning bandwidth utilization notification in response to a bandwidth acquisition request; an information request step for requesting information concerning a selected wireless communication device according to a bandwidth utilization notification; and a transmission step for transmitting information on equipment connected to each input/output terminal according to an information request; in the wireless communication method, information is transmitted and received in a region in which transmission bandwidth is reserved, information on equipment connected to each of the input/output terminals is managed in association with other wireless communication devices, and a predetermined wireless transmission channel is acquired for wireless communication to transmit and receive information, according to input/output switching of equipment having a plurality of input/output terminals.

Hence according to this invention, the following operations are performed.

Wireless communication devices connected to the equipment linked with each of the input/output terminals are registered in advance in the wireless communication device connected to the equipment having the plurality of input/output terminals, and by requesting the acquisition of a predetermined wireless transmission channel in order to perform wireless communication according to input/output switching of the equipment having the plurality of input/output terminals, returning bandwidth utilization notification in response to a request for bandwidth acquisition, notifying a selected wireless communication device of the utilization of input/output terminals and requesting information according to bandwidth utilization notification, and transmitting information on equipment connected to each of the input/output terminals according to a request for information in a utilization notification, information from a wireless communication device connected to registered equipment is received and information is transmitted to a wireless communication device connected to registered equipment.

A wireless communication method according to the present invention includes an input/output information exchange step for exchanging information indicating data input/output relations of equipment executing the same application with other wireless communication devices, and a unidirectional device link setting step for mutually setting the unidirectional device link relations with another wireless communication device connected to equipment executing the same application, based on information indicating the input/output relation.

Hence according to this invention, the following operations are performed.

In a wireless communication device connected to equipment executing an application, unidirectional device link relations with other wireless communication devices connected to equipment executing the same application are registered, while explicitly stating data input/output relations.

Further, the user judges the application of equipment connected to wireless communication devices, and processing is performed to exchange device link information between devices.

A wireless communication method of this invention includes a registration signal detection step, in which after a registration signal due to operation of a registration switch provided in one of the wireless communication devices is detected, within a predetermined registration information reception time a registration signal resulting from operation of the registration switch of another wireless communication device is detected; an existence notification step, in which after a predetermined registration information reception time has elapsed, another wireless communication device is notified of existence information concerning one wireless communication device; and a registration request exchange step, in which when the other wireless communication device has received existence notification, registration requests to mutually register a link relation with one wireless communication device are exchanged and transmitted.

Hence according to the present invention, the following operations are performed.

A link registration switch or a link setting function which the user can set is installed in a wireless communication device connected to a device, and device link information and information relating to security are exchanged between wireless communication devices in which the registration button provided on the wireless communication device has been operated to input by a user.

By setting a link intended by the user between wireless communication devices, the registration buttons of which have been operated to input within a predetermined time, a network is configured based on the security intended by the user.

Further, a wireless communication device of the present invention includes equipment-specific information detection means which detects equipment-specific information indicating the input/output relation of data of equipment executing the same application, and unidirectional device link setting means which sets unidirectional device link relations with other wireless communication devices connected to equipment executing the same application, based on equipment-specific information.

Hence according to the present invention, the following operations are performed.

In order for information to be transmitted between registered wireless communication devices, predetermined encoded information is exchanged while explicitly stating data input/output relations under application instructions, and when application data is to be exchanged, data encoded using encoding information is transmitted and the unidirectional device link relation is registered by both the wireless communication devices.

Further, a wireless communication system of this invention includes a wireless communication device which, based on information indicating the input or output relation of data of equipment executing the same application, sets the unidirectional device link relation for input or for output with another wireless communication device connected to equipment executing the same application, and another wireless communication device which, based on information indicating the output or input relation of data of equipment executing the same application, sets the unidirectional device link relation for output or for input with the wireless communication device connected to the equipment executing the same application.

Hence according to the present invention, the following operations are performed.

In a wireless communication device connected to equipment executing an application, link relations are registered, while explicitly stating the data input/output relations with another wireless communication device connected to equipment executing the same application.

In order to transmit information between registered wireless communication devices, predetermined encoding information is exchanged under application instructions, and when application data is to be exchanged, data encoded using encoding information is transmitted.

Further, the above information is exchanged after specifying the directions of input/output with respect to application, so that careless exchange of information with unintended wireless communication devices can be avoided.

BRIEF DESCRIPTION OF THE DRAWINGS

FIG. 16 is a diagram showing an example of configuration of an existence notification command;

FIG. 17 is a diagram showing an example of configuration of a registration request command;

FIG. 18 is a diagram showing an example of configuration of a registration notification command;

FIG. 19 is a diagram showing an example of configuration of a registration notification and encoding information command; and, FIG. 20 is a flowchart showing operation for registration of a device link.

DESCRIPTION OF THE PREFERRED EMBODIMENTS

Figure 1:
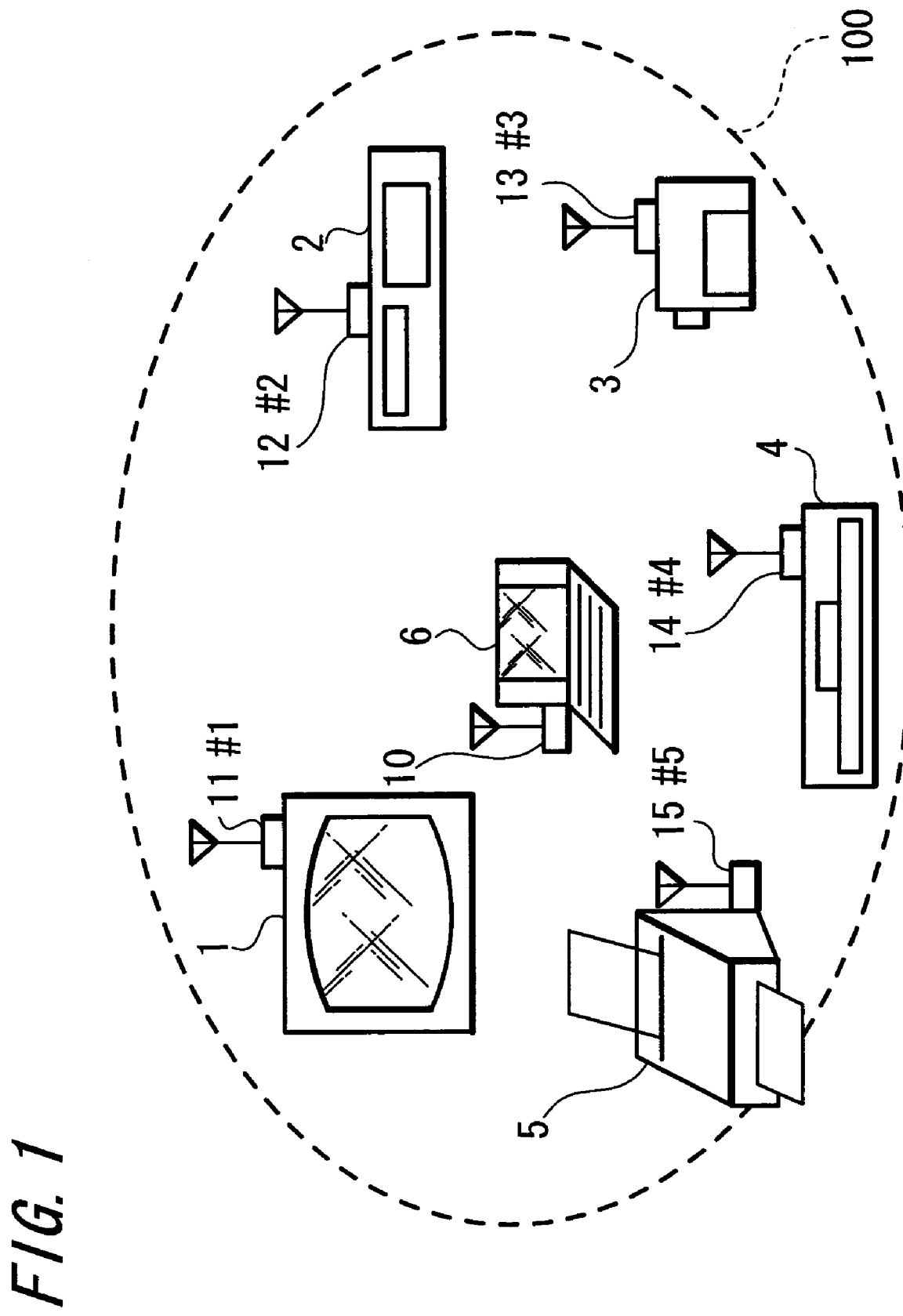
FIG. 1 is a diagram showing an example of configuration of a wireless network applied to an embodiment of this invention.

Hereinafter, embodiments of the present invention are explained, referring to the drawings.

FIG. 1 shows an example of the configuration of a wireless network applied to an embodiment of the present invention. Here, a wireless communication device connected to a personal computer 6 operates as a control station wireless communication device 10, and a wireless network 100 is formed.

This wireless network 100 is formed by a #1 wireless communication device 11 connected to a television receiver or other monitor device 1, a #2 wireless communication device 12 connected to a VCR (video cassette recorder) device 2, a #3 wireless communication device 13 connected to a camcorder (videotape recorder) 3, a #4 wireless communication device 14 connected to a DVD (Digital Versatile Disc) reproducing device 4, and a #5 wireless communication device 15 connected to a printer output device 5.

Figure 2:
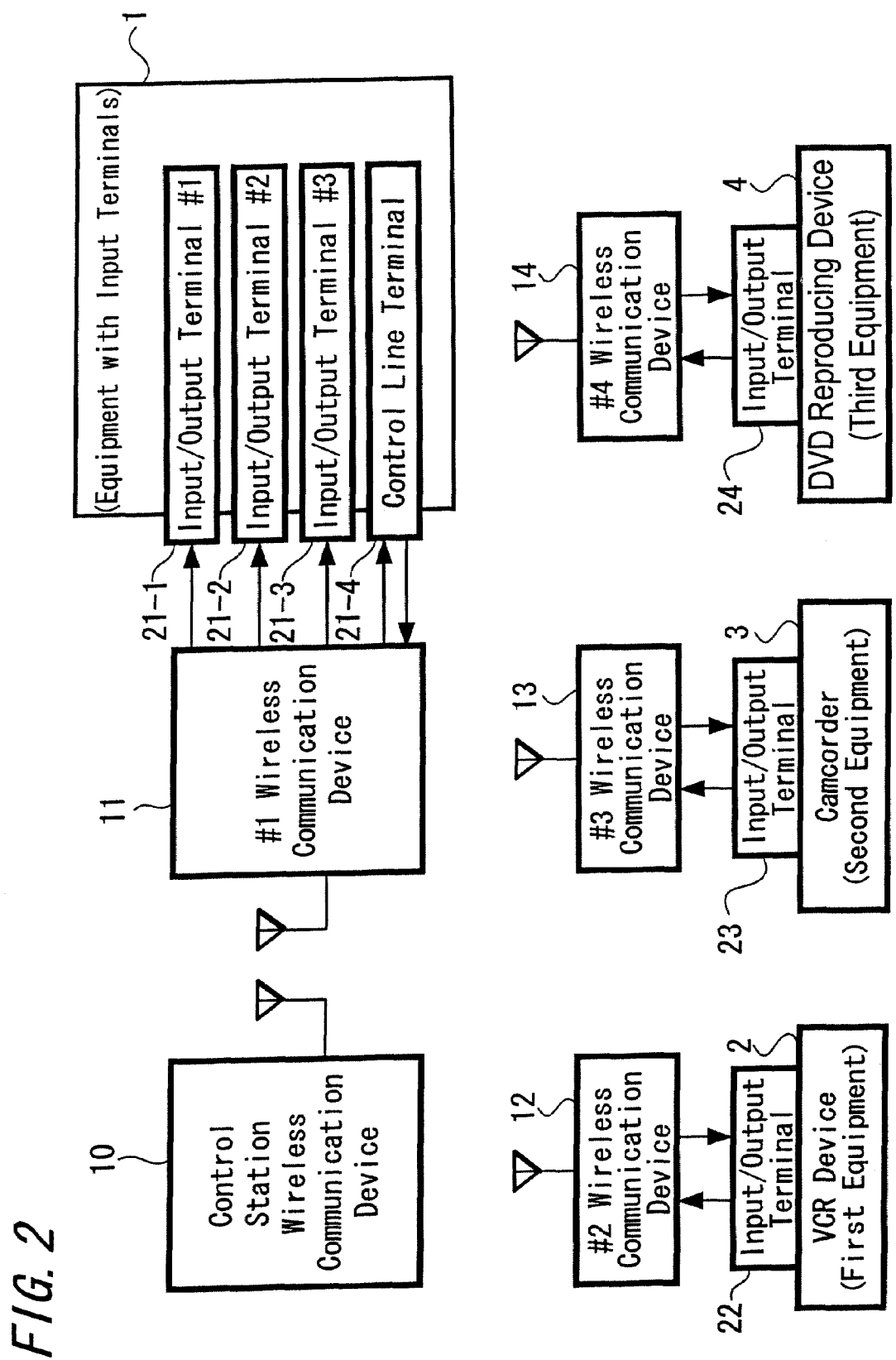
FIG. 2 is a diagram showing an example of connection of a wireless network system applied to a first embodiment of this invention.

FIG. 2 shows an example of connections in a wireless network system applied to the first embodiment of the present invention.

Here, the wireless network system is formed by the control station wireless communication device 10 which forms the wireless network; the #1 wireless communication device 11 connected to the television receiver or other monitor device 1 as equipment having a plurality of input/output terminals #1 (21-1), #2 (21-2), #3 (21-3) and control line terminals 21-4; the #2 wireless communication device 12 connected, via the input/output terminals 22, to the first equipment which is the VCR device 2; the #3 wireless communication device 13 connected, via the input/output terminals 23, to the second equipment which is the camcorder 3; and the #4 wireless communication device 14 connected, via the input/output terminals 24, to the third equipment which is the DVD reproducing device 4.

In this embodiment, the relation between the #1 input terminal 21-1 and the #2 wireless communication device 12 connected to the VCR device 2 as the first equipment, the relation between the #2 input terminal 21-2 and the #3 wireless communication device 13 connected to the camcorder 3 as the second equipment, and the relation between the #3 input terminal 21-3 and the #4 wireless communication device 14 connected to the DVD reproducing device 4 as the third equipment, are each registered in the #1 wireless communication device 11 connected to the television receiver or other monitor device 1 as the equipment having a plurality of input/output terminals #1 (21-1), #2 (21-2), #3 (21-3) and control line terminals 21-4.

Figure 3:
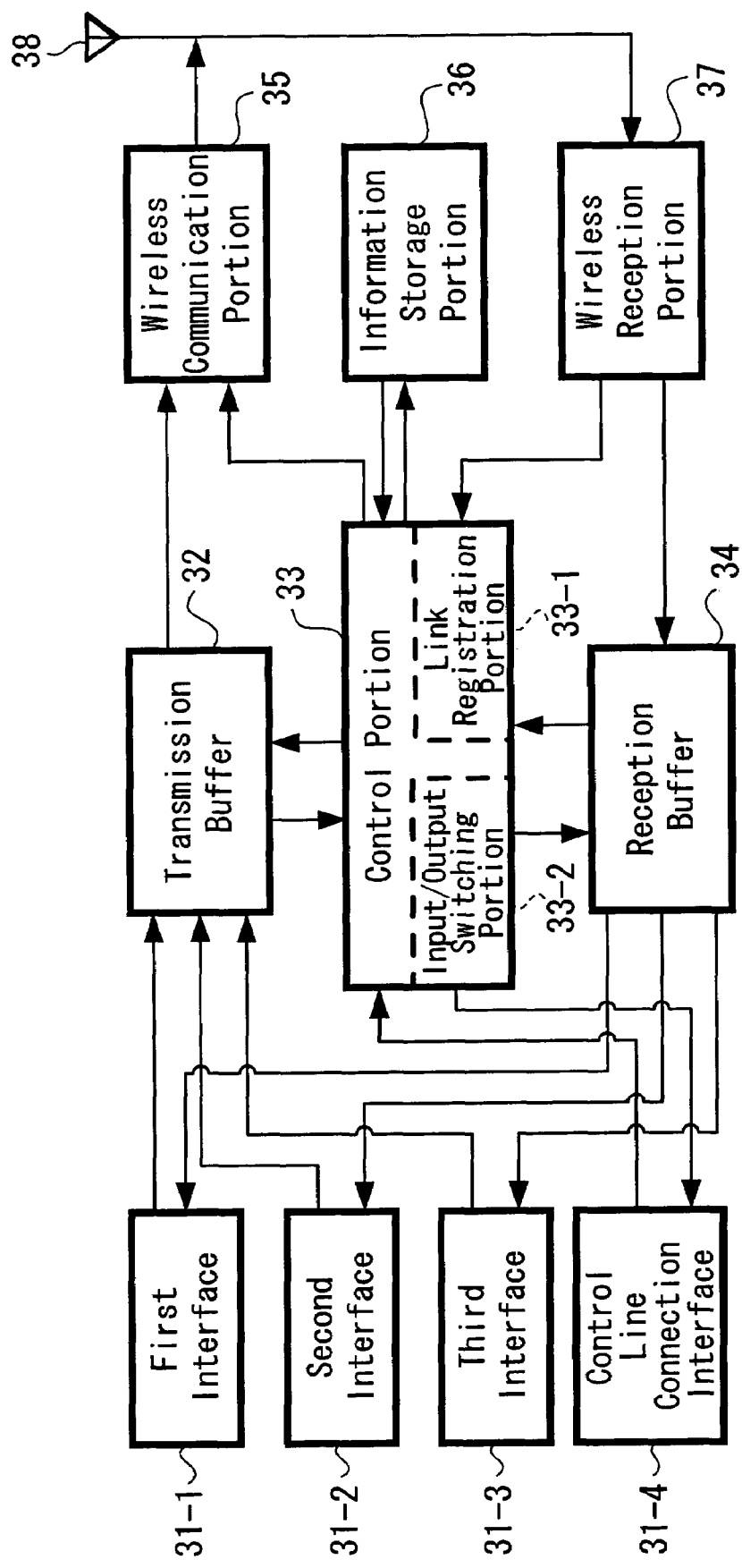
FIG. 3 is a diagram showing an example of configuration of a wireless communication device applied to the first embodiment of this invention.

FIG. 3 is a diagram showing an example of configuration of a wireless communication device according to this embodiment.

In this wireless communication device, there is specifically shown, for convenience, a configuration in which a plurality of interfaces are provided for connecting equipment including a plurality of input/output terminals; however, a configuration may be employed in which a single interface is used for a plurality of input/output terminals by switching thereof.

In this embodiment, the wireless communication device includes a first interface 31-1, a second interface 31-2, a third interface 31-3, and a control line connection interface 31-4 to exchange control signals with connected equipment.

Here, in order to perform wireless transmission of information, a wireless communication device includes a transmission buffer 32 that accumulates information which has arrived to be transmitted from any one among the plurality of interfaces, whether the first interface 31-1, the second interface 31-2, or the third interface 31-3. Further, in order to perform wireless reception of information, the wireless communication device includes a reception buffer 34 that accumulates information which is transmitted to any one among the plurality of interfaces, whether the first interface 31-1, the second interface 31-2, or the third interface 31-3.

Further, the wireless communication device includes a control portion 33, which manages a series of operations in the wireless communication device of this embodiment, performs switching among the first interface 31-1, second interface 31-2 and third interface 31-3 based on signals from the control line connection interface 31-4, and controls communication to the first interface 31-1, second interface 31-2, and third interface 31-3. The control portion 33 is configured to have a link registration portion 33-1 which registers link information representing the corresponding relations between each input/output interface and other wireless communication devices, and an input/output switching portion 33-2 which performs input/output switching of each input/output interface.

This control portion 33 is provided with an information storage portion 36 to store link information indicating correspondences between each input/output interface and other wireless communication devices.

Also, the wireless communication device includes a wireless transmission portion 35 to wirelessly transmit various information as wireless signals from an antenna 38 according to predetermined access control, and a wireless reception portion 37 to convert signals obtained via the antenna 38 into information.

Figure 4:
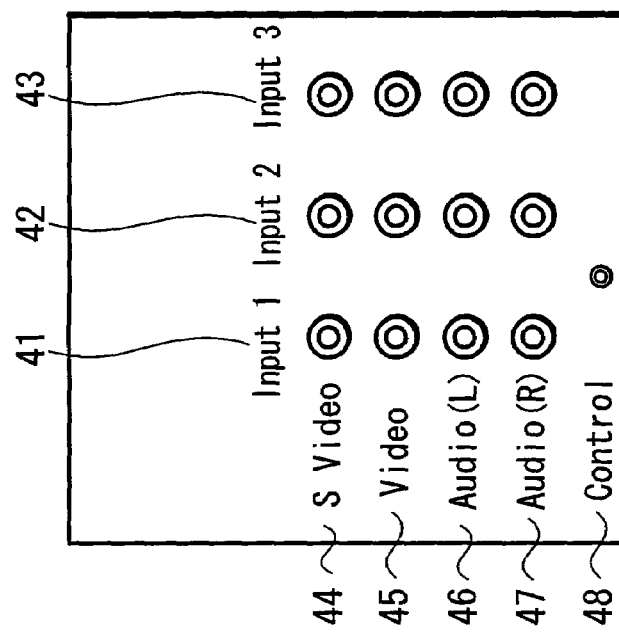
FIG. 4 is a diagram showing an example of configuration of a plurality of input/output terminals in equipment connected to a wireless communication device.

FIG. 4 shows an example of configuration of a plurality of input/output terminals in equipment connected to the wireless communication device applied to this embodiment. Here, as an example of configuration of the plurality of input/output terminals in, for example, a monitor device, a state is shown in which three input systems, which are input 1 (41), input 2 (42), and input 3 (43), are prepared, and in each of these are combined S (separate) video terminals 44 in which the brilliance signal (Y) and chrominance signal (C) are processed separately, a video terminal 45, a left-side audio (L) terminal 46, and a right-side audio (R) terminal 47.

Further, in this configuration in order to exchange control information, a control terminal 48 also exists, and when input to the equipment is switched over, notification takes place.

Figure 5:
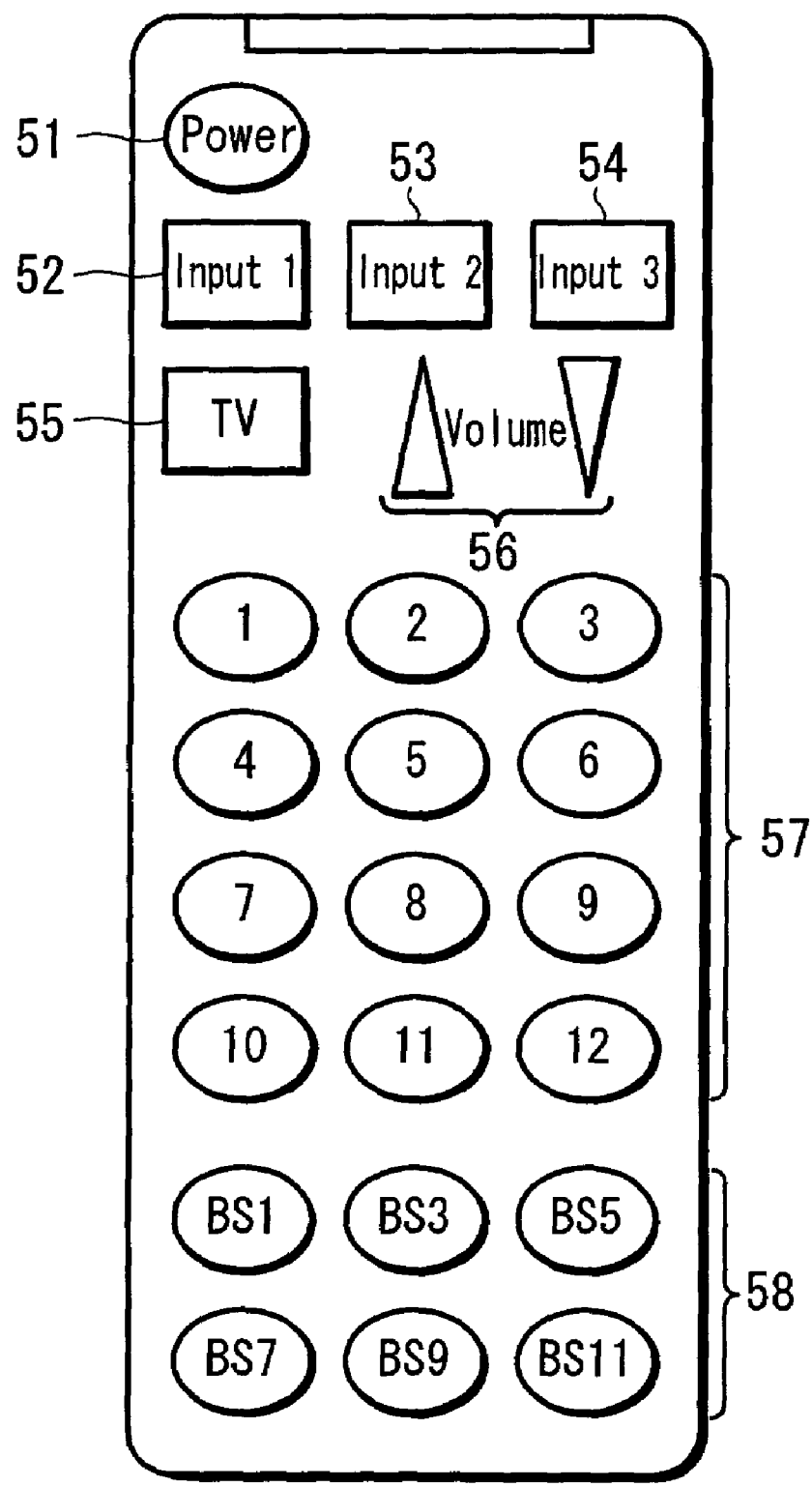
FIG. 5 is a diagram showing the configuration of a remote controller as a means of switching the input of equipment connected to a wireless communication device.

FIG. 5 shows configuration of a remote controller as a means for switching the input of equipment connected to a wireless communication device applied to this embodiment.

This remote controller is configured to have such button groups and similar as a power supply button 51 which turns the equipment power supply on and off; an input 1 button (52), input 2 button (53), and input 3 button (54) to switch input; a TV button 55 for use when viewing programs received by the television receiver; sound volume buttons 56 to adjust the sound volume; a surface wave broadcast channel button 57 to select a received program channel; and a satellite broadcast channel button 58.

That is, through operation by the user of the input button 1 (52), input button 2 (53), and input button 3 (54), which are input switching buttons on the remote controller shown in the diagram, input switching commands are supplied to the monitor device 1, so that switching of input among the input/output terminals #1 (21-1), #2 (21-2), and #3 (21-3) of the monitor device 1 is performed.

Figure 6:
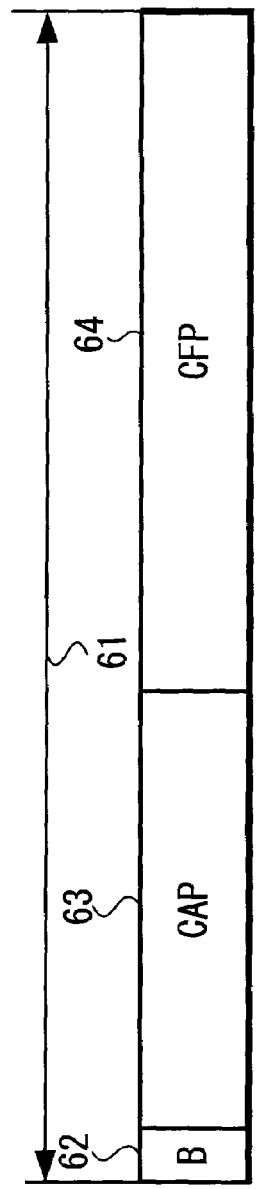
FIG. 6 is a diagram showing an example of configuration of a frame according to the IEEE 802.15.3 communication standard.

FIG. 6 is a diagram showing an example of configuration of a frame according to the IEEE 802.15.3 communication standard.

In FIG. 6, a frame period 61 has, within a network connected in a peer-to-peer configuration, a B (Beacon) section 62 output from the communication station serving as the coordinator at the fixed frame period 21; a CAP (Contention Access Period) 63 in which each communication station performs asynchronous communication using CSMA (Carrier Sense Multiple Access); and a CFP (Contention Free Period) 64 in which each communication station acquires reserved bandwidth and performs bandwidth-reserved communication.

Figure 7:
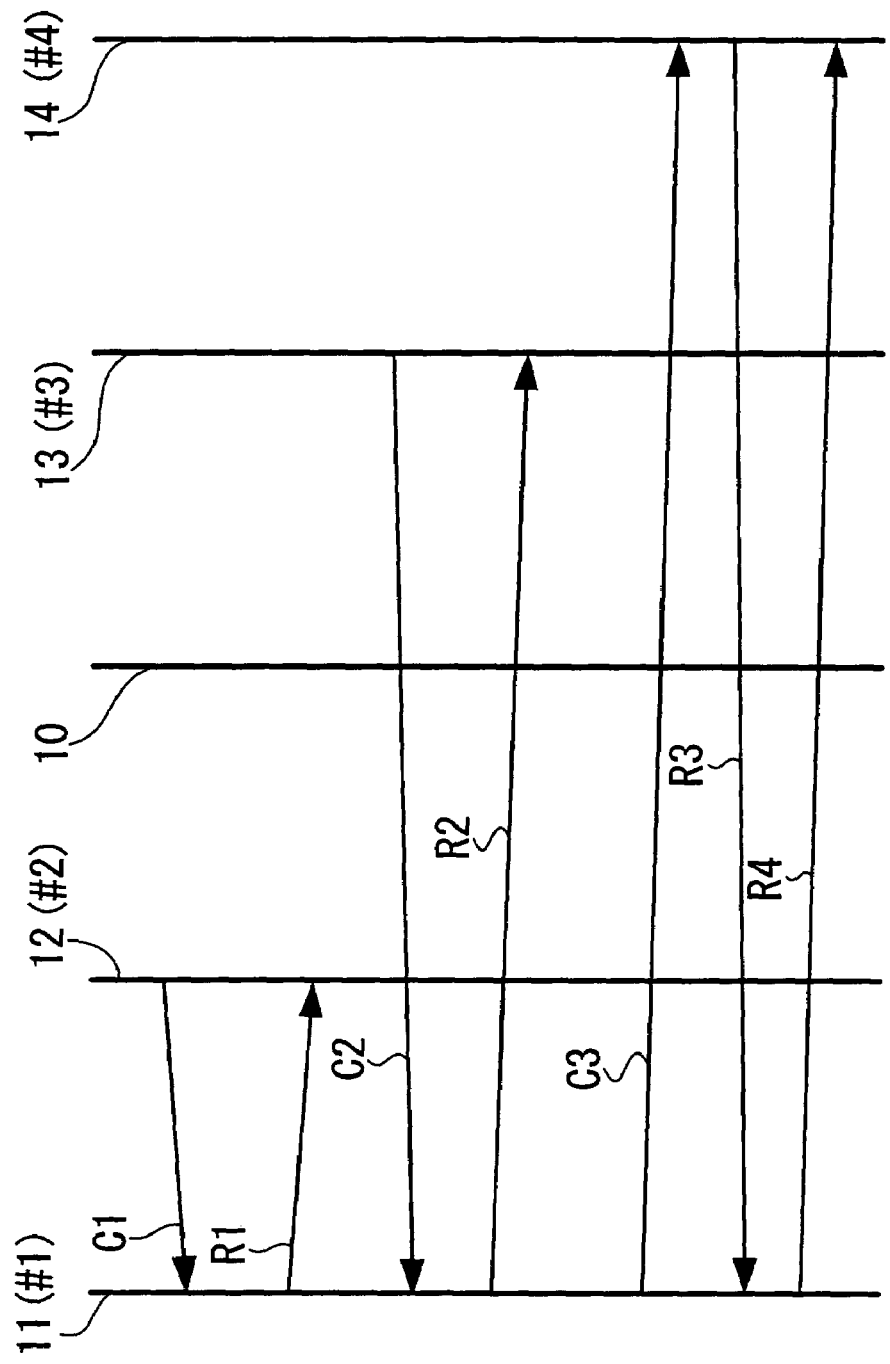
FIG. 7 is a diagram showing a registration sequence for a wireless communication device.

FIG. 7 is a diagram showing a registration sequence for a wireless communication device applied to this embodiment.

First, hereupon, the #2 wireless communication device 12 and the #1 input/output terminal 21-1 of the #1 wireless communication device 11 are made to correspond; and the manner in which registration of this corresponding relation is performed is shown.

At this time, a #2 wireless communication device registration request C1 requesting registration of the #2 wireless communication device 12 in the #1 wireless communication device 11 is transmitted from the #2 wireless communication device 12, and in response the #2 wireless communication device 12 and the #1 input/output terminal 21-1 of the #1 wireless communication device 11 are made to correspond; and a #1 input/output terminal registration notification R1 indicating the registration of this corresponding relation is returned from the #1 wireless communication device 11 to the #2 wireless communication device 12.

Further, the #3 wireless communication device 13 and the #2 input/output terminal 21-2 of the #1 wireless communication device 11 are made to correspond; and the manner in which this corresponding relation is registered is shown.

Here also, a #3 wireless communication device registration request C2 requesting registration of the #3 wireless communication device 13 in the #1 wireless communication device 11 is transmitted from the #3 wireless communication device 13, and in response the #3 wireless communication device 13 and the #2 input/output terminal 21-2 of the #1 wireless communication device 11 are made to correspond, and a #2 input/output terminal registration notification R2 indicating registration of this corresponding relation is returned from the #1 wireless communication device 11 to the #3 wireless communication device 13.

Also, the #3 input/output terminal 21-3 of the #1 wireless communication device 11 and the #4 wireless communication device 14 are made to correspond, and the manner of registration operation of this corresponding relation is shown.

Here, a #1 wireless communication device registration request C3 requesting registration of the #1 wireless communication device 11 in the #4 wireless communication device 14 is transmitted from the #1 wireless communication device 11, and in response the #1 wireless communication device 11 and the #4 wireless communication device 14 are made to correspond, and a #4 wireless communication device registration notification R3 indicating registration of this corresponding relation is returned from the #4 wireless communication device 14 to the #1 wireless communication device 11.

The #4 wireless communication device registration notification R3 is equivalent to a #4 wireless communication device registration request from the #4 wireless communication device 14 to the #1 wireless communication device 11, and so in response to this, the #4 wireless communication device 14 and #3 input/output terminal 21-3 of the #1 wireless communication device 11 are made to correspond, and then a #3 input/output terminal registration notification R4 is returned from the #1 wireless communication device 11 to the #4 wireless communication device 14.

Accordingly, corresponding relations of the other wireless communication devices with the input/output terminals #3 (21-3), #2 (21-2), #1 (21-1) of wireless communication #1 device (11), #2 device (12), #3 device (13), #4 device (14) are respectively registered.

Moreover, in this configuration wireless communication devices can be mutually registered regardless of from which wireless communication device registration request is sent, or a bidirectional registration requests.

Figure 8:
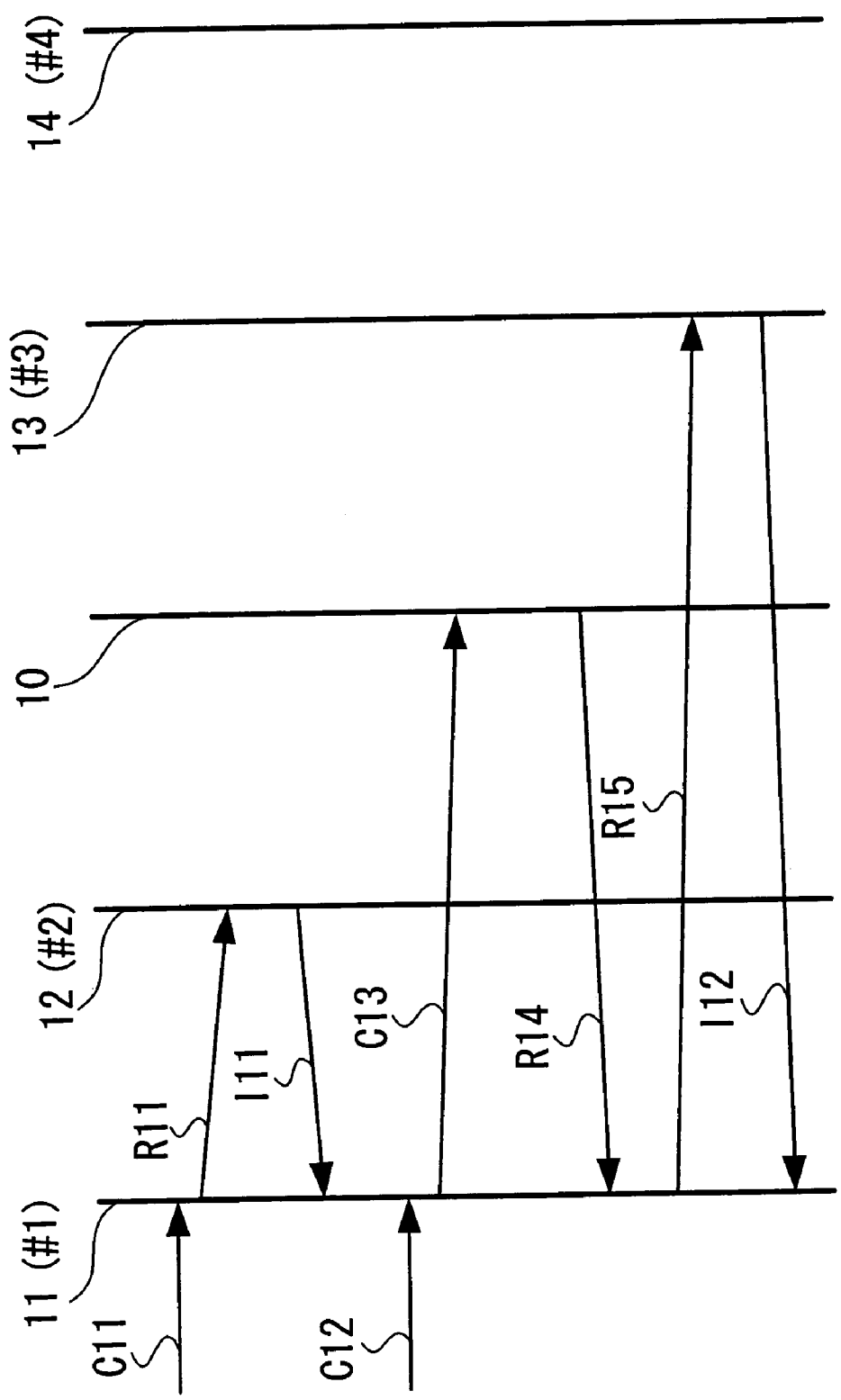
FIG. 8 is a diagram showing an information transmission sequence for a wireless communication device.

FIG. 8 shows an information transmission sequence for a wireless communication device applied to the embodiment of the present invention First, for example, in a processing when a user operates the input 1 button 52 of the remote controller shown in FIG. 5, an input switching command C11 is sent from the remote controller to the #1 wireless communication device 11, and then when the #1 input/output terminal 21-1 of the #1 wireless communication device 11 is selected, a #1 input/output terminal utilization notification R11 is transmitted from the #1 wireless communication device 11 to the #2 wireless communication device 12, upon which #2 wireless communication device information transmission I11 from the #2 wireless communication device 12 to the #1 wireless communication device 11 is performed.

Further, in a processing when a user operates the input 2 button 53 of the remote controller shown in FIG. 5, an input switching command C12 is sent from the remote controller to the #1 wireless communication device 11, and then when the #1 input/output terminal 21-1 of the #1 wireless communication device 11 is selected, a #1 wireless communication device bandwidth acquisition request C13 is transmitted from the #1 wireless communication device 11 to the control station wireless communication device 10; in response, a bandwidth utilization notification R14 is returned from the control station wireless communication device 10 to the #1 wireless communication device 11.

Further, FIG. 8 shows the manner, in which a #2 input/output terminal utilization notification R15 is transmitted from the #1 wireless communication device 11 to the #3 wireless communication device 13, and #3 wireless communication device information transmission I12 from the #3 wireless communication device 13 to the #1 wireless communication device 11 is performed.

Figure 9:
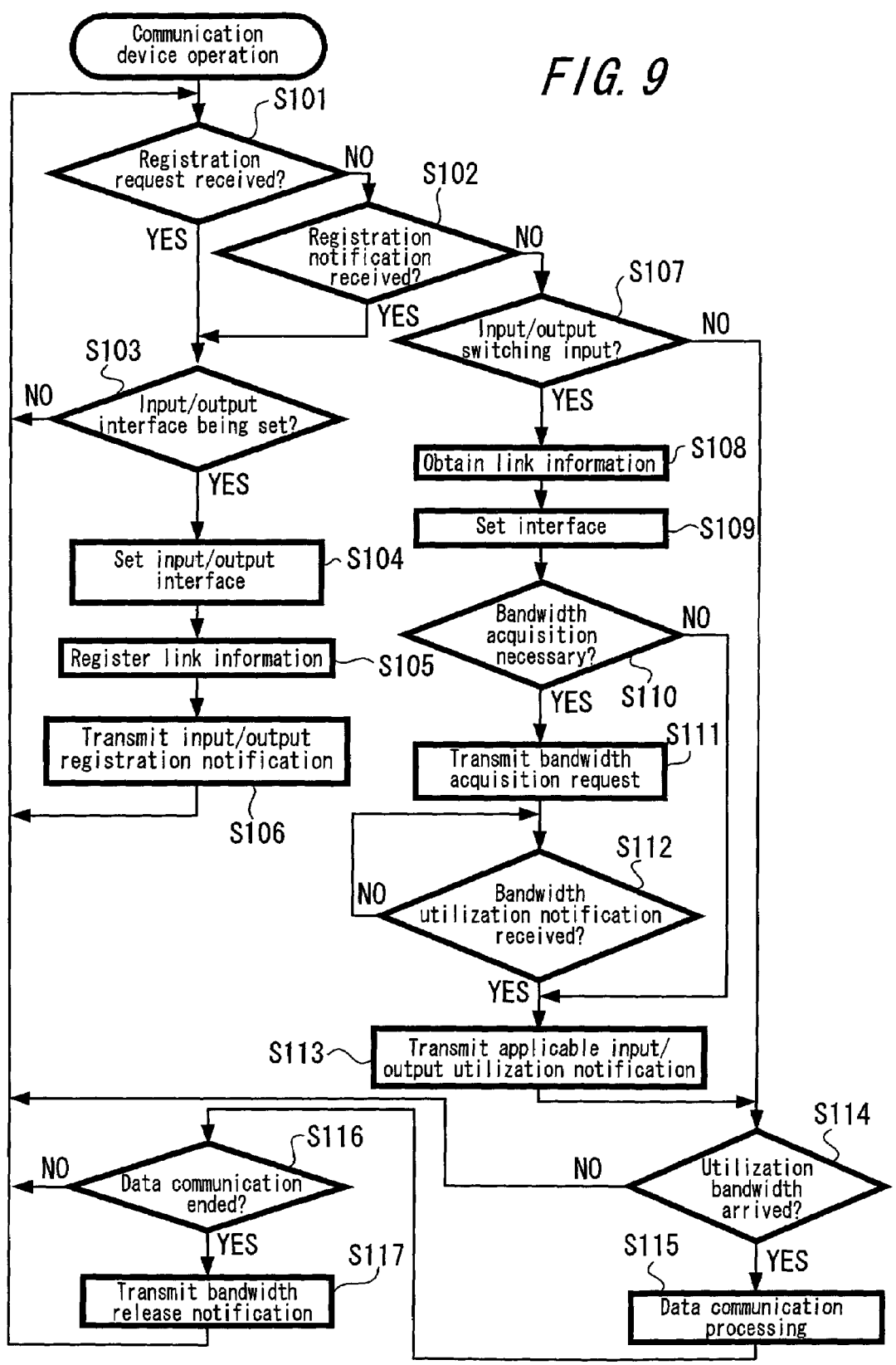
FIG. 9 is a flowchart showing the operation of a wireless communication device.

FIG. 9 is a flowchart showing the operation of a wireless communication device applied to this embodiment.

First, in S101 the control portion 33 judges whether a registration request has been received to register link information indicating the corresponding relations between each input/output interface of the first interface 31-1, second interface 31-2, or third interface 31-3, of the #1 wireless communication device 11, #2 wireless communication device 12, #3 wireless communication device 13 and #4 wireless communication device 14, and other wireless communication device; when the request is received, operation proceeds to S103.

If no registration request has been received, in S102 the control portion 33 judges whether registration notification has been received from another wireless communication device, and if registration notification has been received, operation proceeds to S103.

In S103, the control portion 33 judges whether each of the input/output interfaces of the first interface 31-1, second interface 31-2 or third interface 31-3 is being set, and if the setting is being performed, in S104 the control portion 33 sets that input/output interface, in S105 the control portion 33 registers link information in the information storage portion 36, and in S106 the control portion 33 transmits input/output registration notification to a registered wireless communication device. Then, operation returns to S101, and data information transmission/reception operations are executed.

If in S103 it is judged that an input/output interface is not being set, the above processing is not performed, and operation proceeds to S101.

If in the judgment of S102 it is judged that registration notification has not been received, then in S107 the control portion 33 judges whether there has been input/output switching at each of the input/output interfaces of the first interface 31-1, second interface 31-2, or third interface 31-3 in the wireless communication device; and if there has been switching, in S108 the control portion 33 obtains from the information storage portion 36 link information indicating the corresponding relations between the first interface 31-1, second interface 31-2 or third interface 31-3 and the switched wireless communication device, and in S109 the control portion 33 performs settings of interface.

Here, in S110 the control portion 33 judges whether bandwidth acquisition is necessary, and if acquisition is necessary, in S111 the control portion 33 transmits a bandwidth acquisition request to the wireless communication device serving as the control station; if in S112 a bandwidth utilization notification is sent from the control station in response, in S113 the control portion 33 notifies the wireless communication device to be linked of the input/output interface utilization notification.

If, in the judgment of S110, bandwidth acquisition is not necessary, in S113 the control portion 33 notifies the wireless communication device to be linked of the input/output interface utilization notification.

Subsequently, in S114 the control portion 33 judges whether the bandwidth to be utilized in this communication has arrived; if the bandwidth has arrived, in S115 data is transmitted or received, and data communication processing is performed between the input/output interface and the other wireless communication device.

Further, in S116 the control portion 33 judges whether data communication has ended; if communication has ended, in S117 the control portion 33 transmits a bandwidth release notification to the control station, ending the series of processing, and operation returns to S101 to repeat processing.

If in the judgment of S114 the bandwidth to be utilized in the communication has not arrived, or if, in the judgment of S116, data communication has not ended, operation returns to S101 and processing is repeated.

Figure 10:
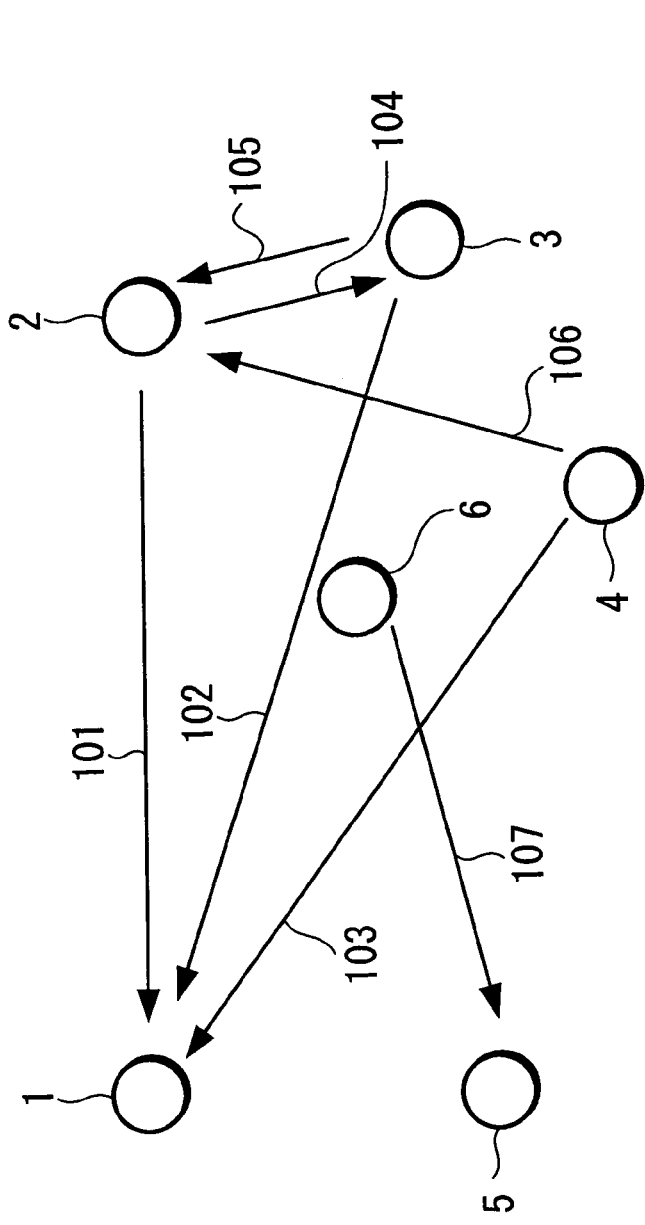
FIG. 10 is a diagram showing an example of registration of a device link by an application, applied to a second embodiment of this invention.

FIG. 10 is a diagram showing an example of registration of a device link by an application, according to a second embodiment of the present invention.

This diagram shows links constructed between devices by applications of equipment connected to wireless communication devices in the wireless network 100 shown in FIG. 1.

In the monitor device 1, an input device link 101 from a VCR device 2, an input device link 102 from a camcorder 3, and an input device link 103 from a DVD reproducing device 4 are registered as input device links.

In the VCR device 2, an output device link 101 to the monitor device 1, and an output device link 104 to the camcorder 3 are registered as output device links; and in addition, an input device link 105 from the camcorder 3 and an input device link 106 from the DVD reproducing device 4 are registered as input device links.

In the camcorder 3, an output device link 102 to the monitor device 1 and an output device link 105 to the VCR device 2 are registered as output device links; and in addition, an input device link 104 from the VCR device 2 is registered as an input device link.

In the DVD reproducing device 4, an output device link 103 to the monitor device 1 and an output device link 106 to the VCR device 2 are registered as output device links.

In the printer output device 5, an input device link 107 from the personal computer 6 is registered as an input device link.

In the personal computer 6, an output device link 107 to the printer output device 5 is registered as an output device link.

Figure 11:
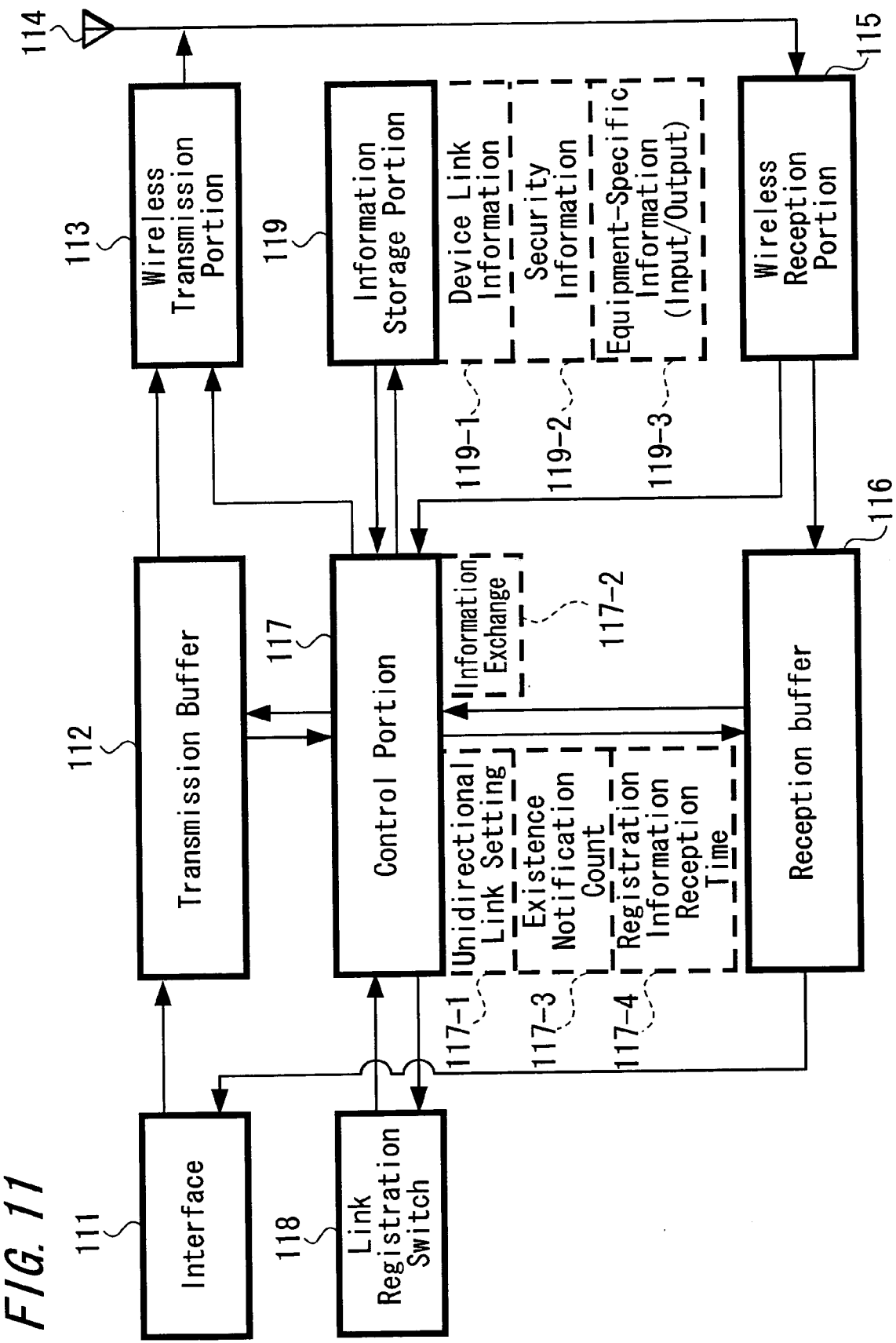
FIG. 11 is a drawing showing an example of configuration of a wireless communication device applied to the second embodiment of this invention.

FIG. 11 is a diagram showing an example of configuration of a wireless communication device according to the second embodiment of the present invention.

This wireless communication device includes an interface 111 to exchange information from equipment connected to the wireless communication device, a transmission buffer 112 which accumulates information arriving from applications in the equipment, a wireless transmission portion 113 which converts the information into wireless signals to be transmitted, and an antenna 114 which transmits wireless signals converted under predetermined access control.

The wireless communication device further includes a wireless reception portion 115 which receives wireless signals from the antenna 114 according to predetermined access control and extracts information, as well as a reception buffer 116 which accumulates the wireless information received to transfer the information via the interface 111 to applications of equipment.

Further, this wireless communication device includes a control portion 117 which manages a series of operations and performs overall control of each operating portions according to predetermined control in the wireless communication device applied to the embodiment of the present invention.

In this embodiment, the control portion 117 is provided with a link registration switch 118 which performs a predetermined procedure according to an instruction input by the user, and which outputs a registration signal to establish a device link; and in addition, an information storage portion 119 to store information indicating link connection information between devices is connected to the control portion 117.

This control portion 117 is configured having a unidirectional link setting portion 117-1 to make settings for input or output unidirectional link connections between devices, an information exchange portion 117-2 which exchanges device link information 119-1, security information 119-2 and equipment-specific (input/output) information 119-3 between devices, an existence notification count portion 117-3 which sets the number of transmission on notification of the existence of the device itself, and a registration information reception time portion 117-4 which sets the reception time of registration information.

Further, the information storage portion 119 stores the device link information 119-1, security information 119-2 and equipment-specific (input/output) information 119-3.

Figure 12:
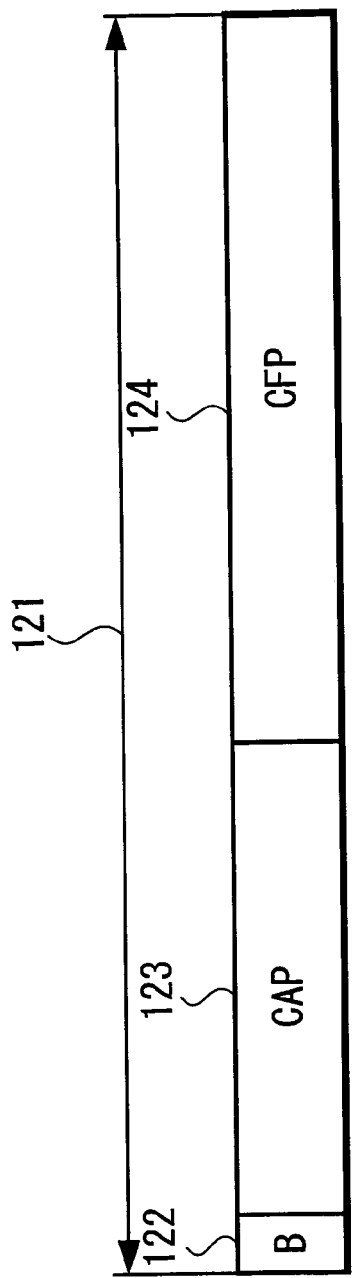
FIG. 12 is a diagram showing an example of the configuration of a frame according to the IEEE 802.15.3 communication standard.

FIG. 12 is a diagram showing an example of configuration of a frame according to the IEEE 802.15.3 communication standard.

In FIG. 12, the frame period 121 includes, in a network with peer-to-peer connections, a B (Beacon) section 122 output with a fixed frame period 121 from a communication station serving as the coordinator during association in order to exchange information prior to authentication; a CAP (Contention Access Period) 123 in which each communication station performs asynchronous communication through CSMA (Carrier Sense Multiple Access); and a CFP (Contention Free Period) 124 in which each communication station acquires reserved bandwidth and performs bandwidth-reserved communication.

Figure 13:
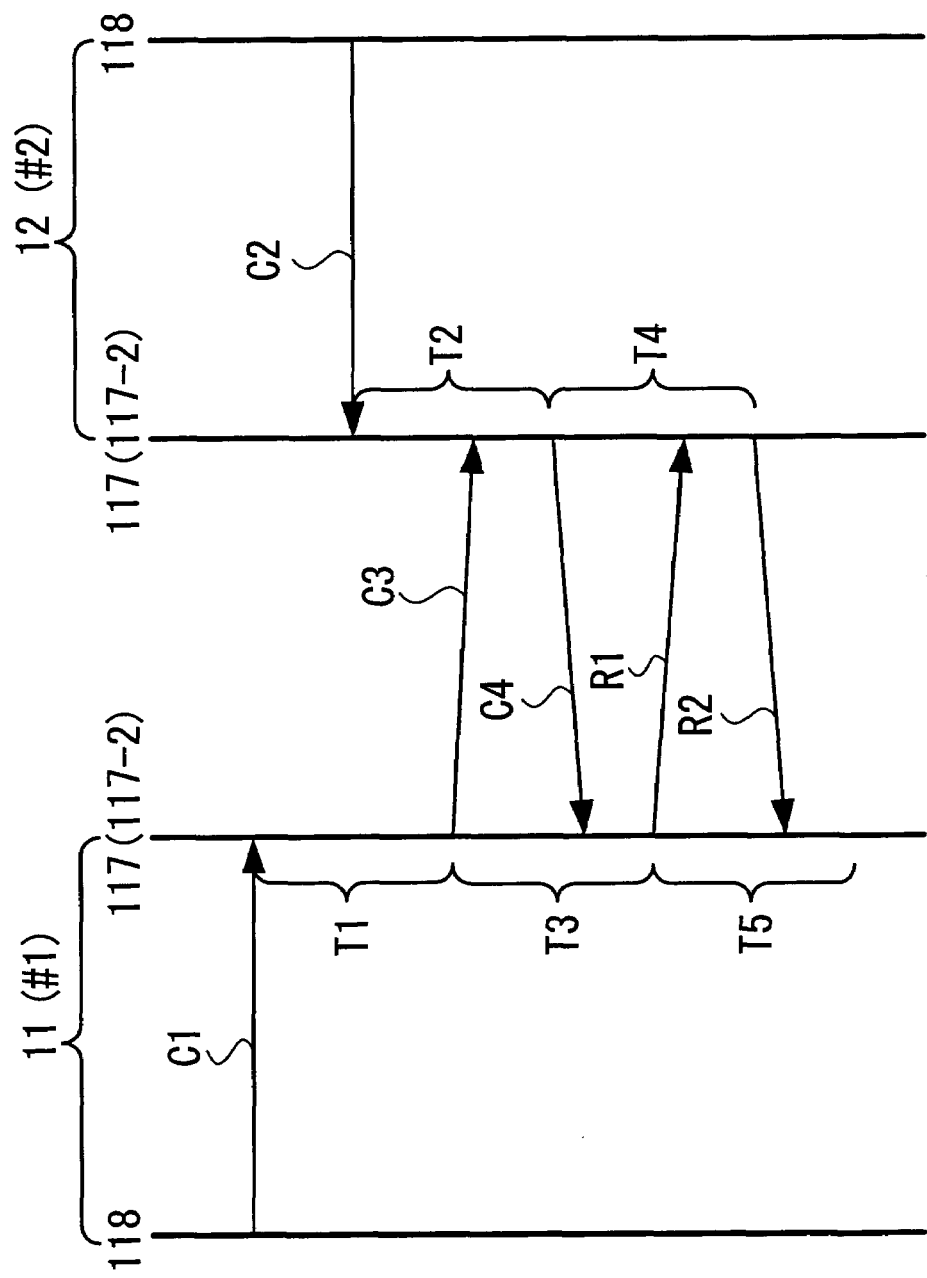
FIG. 13 is a diagram showing an example of processing for registration of a device link.

FIG. 13 is a diagram showing an example of processing for registration operation of a device link according to the embodiment of the present invention.

This processing shows an example of registration of a link between the #1 wireless communication device 11 and the #2 wireless communication device 12.

Here, after a registration signal C1 due to operation of the registration switch 118 of the #1 wireless communication device 11 is first input to the control portion 117 (information exchange portion 117-2) of the #1 wireless communication device 11, subsequently a registration signal C2 due to operation of the registration switch 118 of the #2 wireless communication device 12 is input to the control portion 117 (information exchange portion 117-2) of the #2 wireless communication device 12.

At this time, because the information input link and output link are respectively specified by the application of the connected equipment, the control portions 117 (information exchange portions 117-2) receive registration signals C1, C2 input by operation of the registration switches 118; then, the control portions 117 (registration information reception time portions 117-4) set predetermined registration information reception times T1, T2, T3, T4, T5, and perform reception processing.

First, in the control portion 117 (information exchange portion 117-2) of the #1 wireless communication device 11, no signals are received before the registration information reception time T1 elapses, and therefore a #1 wireless communication device 11 existence notification/registration request C3 is transmitted to the #2 wireless communication device 12; and a registration information reception time T3 is again set by the control portion 117 (registration information reception time portion 117-4), and reception processing is performed.

In the control portion 117 (information exchange portion 117-2) of the #2 wireless communication device 12, the existence notification/registration request C3 is received from the #1 wireless communication device 11 before the registration information reception time T2 elapses, and so a #2 wireless communication device 12 registration request C4 is transmitted to the #1 wireless communication device 11; and a registration information reception time T4 is again set by the control portion 117 (registration information reception time portion 117-4) and reception processing is performed.

Then, in the control portion 117 (information exchange portion 117-2) of the #1 wireless communication device 11, the registration request C4 is received from the #2 wireless communication device 12 before the registration information reception time T3 elapses, and so a #1 wireless communication device 11 registration notification R1 is transmitted to the #2 wireless communication device 12; and a registration information reception time T5 is again set by the control portion 117 (registration information reception time portion 117-4), and reception processing is performed.

Further, in the control portion 117 (information exchange portion 117-2) of the #2 wireless communication device 12, the existence notification/registration request R1 is received from the #1 wireless communication device 11 before the registration information reception time T4 elapses, and so a #2 wireless communication device 12 registration notification R2 is transmitted to the #1 wireless communication device 11; and the control portion 117 (unidirectional link setting portion 117-1) of the #2 wireless communication device 12 makes the setting for a device link with the #1 wireless communication device 11.

Also, in the control portion 117 (information exchange portion 117-2) of the #1 wireless communication device 11, after receiving the #2 wireless communication device 12 registration notification R2, the control portion 117 (unidirectional link setting portion 117-1) of the #1 wireless communication device 11 makes the setting for a device link with the #2 wireless communication device 12.

Hereupon, in cases where the output device link shown in FIG. 2 is registered in the wireless communication device, a configuration may also be employed in which, during this registration notification, encoding information used between device links is exchanged, if necessary.

Figure 14:
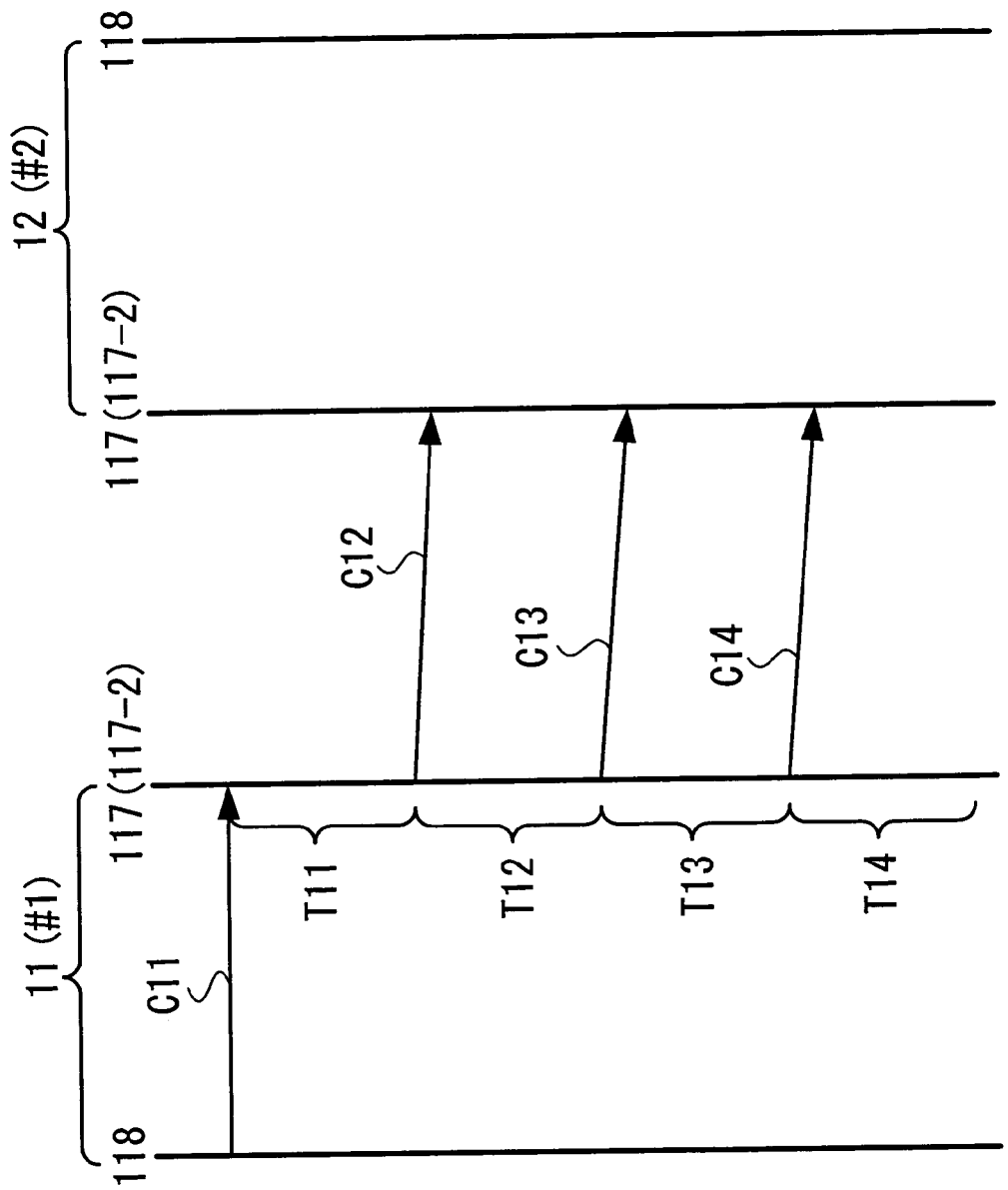
FIG. 14 is a diagram showing an example of processing for avoidance of registration of a device link.

FIG. 14 shows an example of processing for avoidance of registration of a device link according to the embodiment of the present invention.

In this diagram, a state is shown in which a registration signal C11 due to operation of the registration switch 118 is input to the control portion 117 (information exchange portion 117-2) of the #1 wireless communication device 11 at the #1 wireless communication device 11; however, a registration signal due to operation of the registration switch 118 at the #2 wireless communication device 12 is not input to the control portion 117 (information exchange portion 117-2) of the #2 wireless communication device 12.

In this case, when the registration signal C11 due to operation of the registration switch 118 at the #1 wireless communication device 11 is input to the control portion 117 (information exchange portion 117-2) of the #1 wireless communication device 11, after a registration information reception time T11 set by the control portion 117 (registration information reception time portion 117-4) elapses, a #1 wireless communication device 11 existence notification/registration request C12 is transmitted; after a registration information reception time T12 set by the control portion 117 (registration information reception time portion 117-4) elapses, a #1 wireless communication device 11 existence notification/registration request C13 is transmitted; after a registration information reception time T13 set by the control portion 117 (registration information reception time portion 117-4) elapses, a #1 wireless communication device 11 existence notification/registration request C14 is transmitted . . . ; and though in similar manner, existence notification/registration requests C1n have been transmitted a number of times predetermined by the control portion 117 (existence notification count portion 117-3), there is no response from another wireless communication device, and so there is no transition to the series of device link registration operations shown in the above-described FIG. 13.

By this means, if a registration request is not received from the #2 wireless communication device 12 to which the user intends to register a device link, a state is maintained in which a device link is not registered by the #1 wireless communication device 11.

In other words, device link registration for a wireless communication device not intended by the user is not performed, and therefore operation is achieved in which a device link with an ill-intended third party is prevented.

Figure 15:
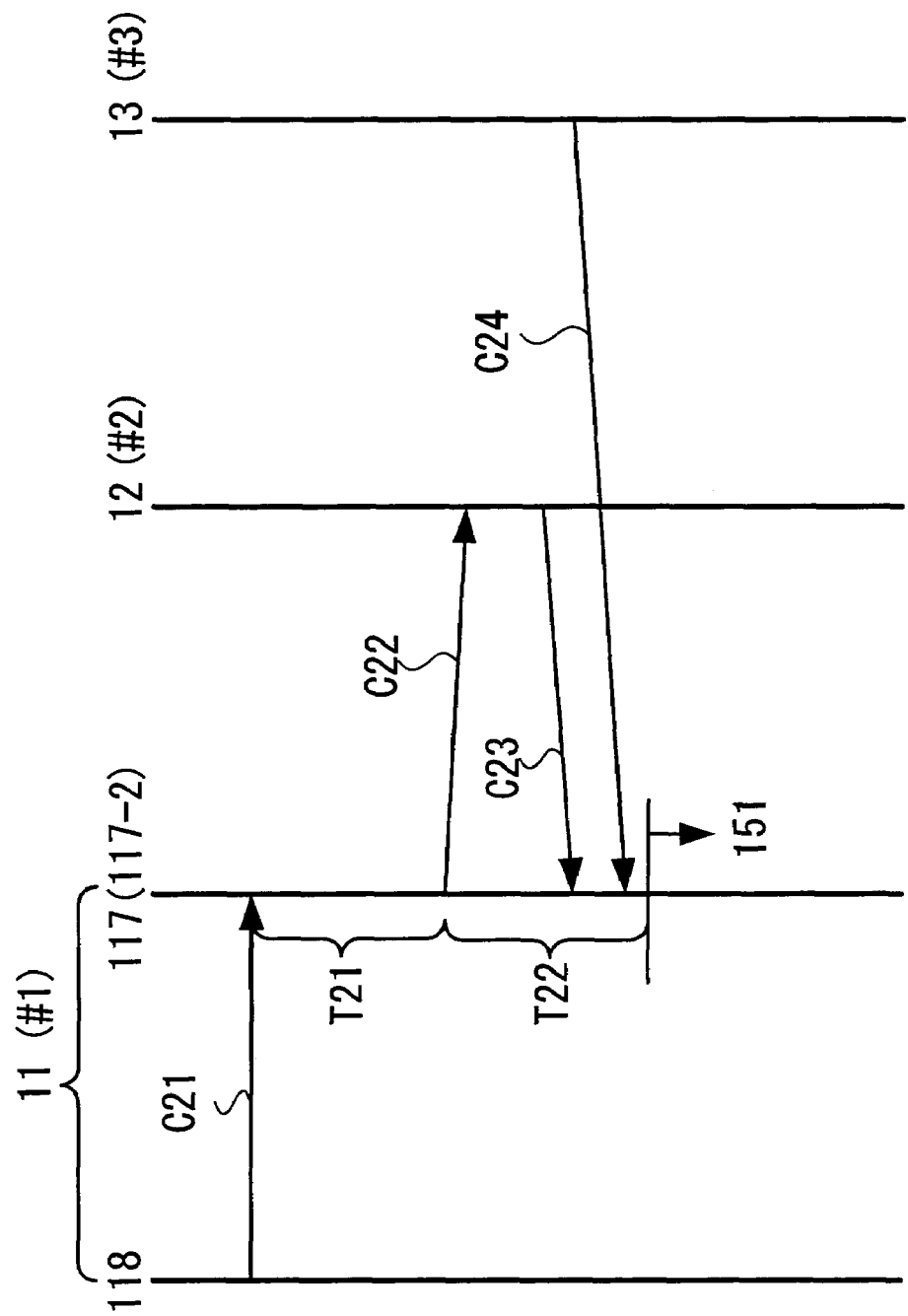
FIG. 15 is a diagram showing an example of abnormal processing for registration of a device link.

FIG. 15 is an example of abnormal processing for registration of a device link according to the embodiment of the present invention.

In this diagram, a case is shown in which, after a registration signal C21 due to operation of the registration switch is input to the control portion 117 (information exchange portion 117-2) of the #1 wireless communication device 11, after a registration information reception time T21 set by the control portion 117 (registration information reception time portion 117-4) has elapsed, an existence notification/registration request C22 is transmitted to the #2 wireless communication device 12, after which a registration request C23 and a registration request C24 are returned, substantially simultaneously, from both the #2 wireless communication device 12 and the #3 wireless communication device 13 within the registration information reception time T22 set by the control portion 117 (registration information reception time portion 117-4).

In this case, at the control portion 117 (information exchange portion 117-2) of the #1 wireless communication device 11 to which the registration signal C21 is input through operation of the registration switch 118 of the #1 wireless communication device 11, after the registration information reception time T21 set by the control portion 117 (registration information reception time portion 117-4) has elapsed, the #1 wireless communication device 11 existence notification/registration request C22 is transmitted to the #2 wireless communication device 12; in response to this, from both the #2 wireless communication device 12 and the #3 wireless communication device 13, the registration request C23 and registration request C24 are respectively returned, and a circumstance arises in which a judgment cannot be made as to which device link registration operation to perform.

In this case, since there remains the possibility that either the #2 wireless communication device 12 or the #3 wireless communication device 13 is a device not intended by the user, the device link registration processing is interrupted, as indicated by a processing interruption 151.

That is, in cases where the intention of the user is not clear, a state in which device link registration of a wireless communication device is not performed is maintained.

By this means, a method is realized in which, even if an ill-intended third-party device attempts to connect a link by taking advantage of a device link between two devices specified by the user, the link registration operation thereof is avoided.

FIG. 16 shows configuration of an existence notification command according to the embodiment of the present invention.

This existence notification command is transmitted when a registration signal resulting from operation of the registration switch 118 is input to the control portion 117 (information exchange portion 117-2), and when an existence notification command is not received from the other wireless communication device before a registration information reception time predetermined by the control portion 117 (registration information reception time portion 117-4) has elapsed.

This command is composed of an existence notification command identifier 161, indicating that the information transmitted from another wireless communication device is an existence notification command; a transmission origin address 162, describing self-referencing information to identify the wireless communication device from which the command has been transmitted; a reception destination address 163, indicating the wireless communication device to which the command has been transmitted (here, not set because not specified); an input/output link information distinction 164, to identify the direction of the device link according to the embodiment of the present invention, that is, whether input direction or output direction; and, an error detection code 165, appended in order to detect command errors or to correct errors.

FIG. 17 shows configuration of a registration request command according to the embodiment of the present invention.

The above registration request command is a command that is returned to a device when the control portion 117 (information exchange portion 117-2) of a wireless communication device receives one existence notification command from the device, and the command is configured having, at least, the information described below, however other necessary information may be appended.

This command is composed of a registration request command identifier 171, indicating that the information transmitted from another wireless communication device is a registration request command; a transmission origin address 172, describing self-referencing information to identify the wireless communication device from which the command has been transmitted; a reception destination address 173, indicating that the registration request has been returned to the wireless communication device which had sent the existence notification command; an input/output link information distinction 174, to identify the direction of the device link according to the embodiment of the present invention, that is, whether input direction or output direction; and, an error detection code 175, appended in order to detect command errors or to correct errors.

FIG. 18 shows configuration of a registration notification command according to the embodiment of the present invention.

The above registration notification command is a command that is returned to a device when the control portion 117 (information exchange portion 117-2) of a wireless communication device receives one registration request command, and when a registration request is issued by the wireless communication device itself and after that a registration notification command is received from the device; and the command is configured having, at least, the information described below, however other necessary information may be appended.

This command is composed of a registration notification command identifier 181, indicating that the information transmitted from another wireless communication device is a registration notification command; a transmission origin address 182, describing self-referencing information to identify the wireless communication device from which the command has been transmitted; a reception destination address 183, specifying the wireless communication device for registration as device link information, and indicating that this has been returned; an input/output link information distinction 184, to identify the direction of the device link according to the embodiment of the present invention, that is, whether input direction or output direction; and, an error detection code 185, appended in order to detect errors or to correct errors in this command.

FIG. 19 shows the configuration of a registration notification and encoding information command according to the embodiment of the present invention.

This registration notification and encoding information command is used in the same cases as registration notification commands, and is used by a command portion 117 (information exchange portion 117-2) of a wireless communication device to notify an input-side device and wireless communication device of encoding information when the connection link of the wireless communication device is an output device link; and the command is configured using, at least, the information described below, however other necessary information may be appended.

This command is composed of a registration request+ encoding information command identifier 191, indicating that the command is a registration notification and encoding information command; a transmission origin address 192, describing self-referencing information to identify the wireless communication device from which the command has been transmitted; a reception destination address 193, specifying the wireless communication device for registration as device link information, and indicating that this has been returned; an input/output link information distinction 194, to identify the direction of the device link according to the embodiment of the present invention, that is, whether input direction or output direction; an encoding object identifier 195, used to identify the data payload which is the object of encoding processing between devices; encoding information 196, which is actually used with the data payload for encoding processing between a plurality of devices; and, an error detection code 197, appended in order to detect errors or to correct errors in this command.

Figure 20:
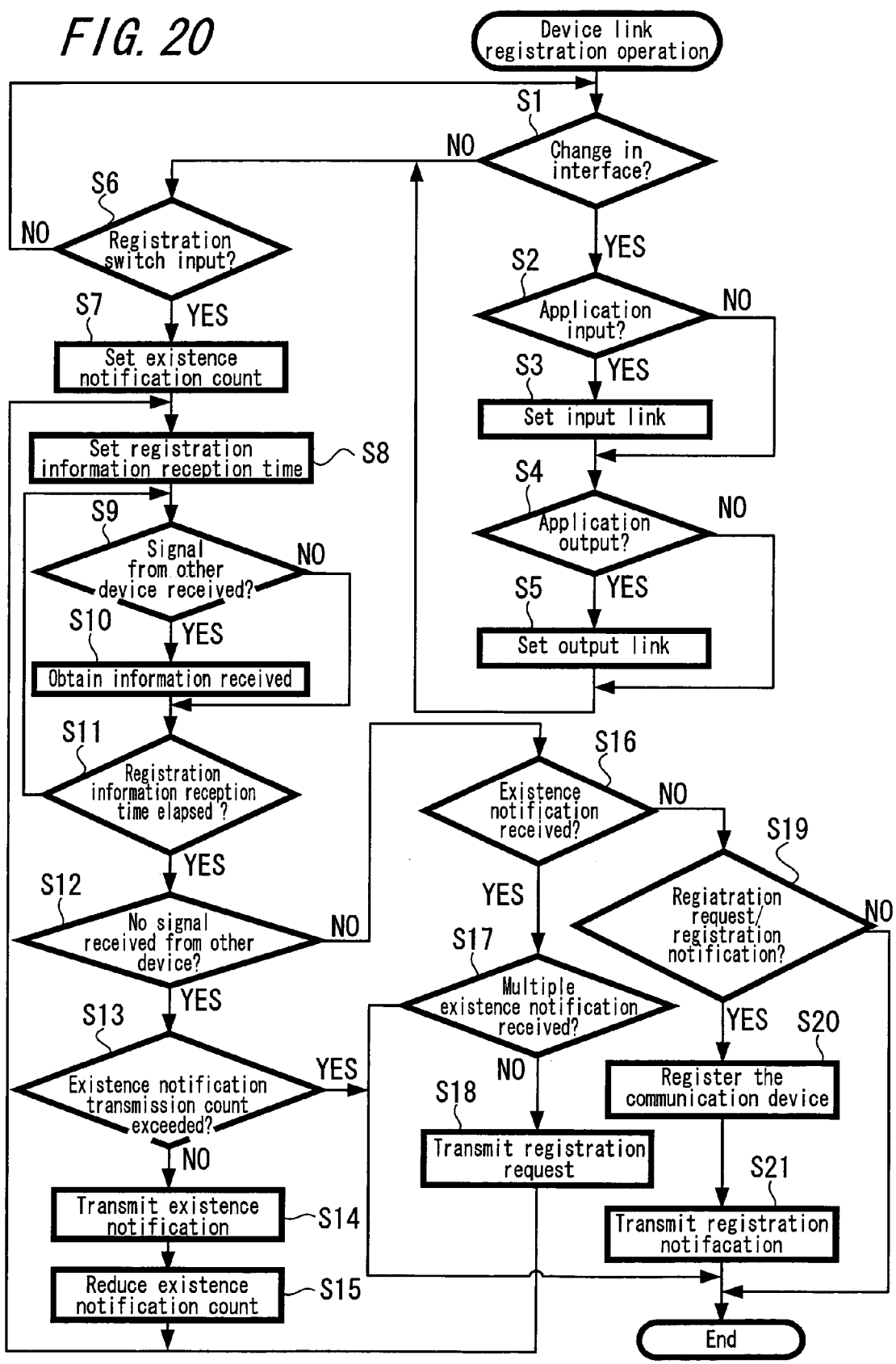

FIG. 20 is a flowchart showing operation for registration of a device link according to the embodiment of the present invention.

First, in step S1 the information exchange portion 117-2 of the control portion 117 of the wireless communication device judges whether a change has occurred in the state of connection with the upper level, within the interface 111 of the wireless communication device shown in FIG. 11, with the input interface or output interface for equipment connected thereto; if a change in the input/output interface has occurred, operation proceeds to step S2.

In step S2, the information exchange portion 117-2 of the control portion 117 judges whether there is input to the application of the connected equipment; if there is input, in step S3 the unidirectional link setting portion 117-1 of the control portion 117 sets an input link. Specifically, an input device link for the application is set, as shown in FIG. 2.

Then in step S4, the information exchange portion 117-2 of the control portion 117 judges whether there is output from the application of the connected equipment; if there is output, in step S5 the unidirectional link setting portion 117-1 of the control portion 117 sets an output link. Specifically, an output device link for the application is set, as shown in FIG. 2.

In the case where there is no change in the input/output interface in the judgment of step S1, and after the input link setting of the above-described step S3 and the output link setting of step S5 are performed, operation proceeds to step S6.

In step S6, the information exchange portion 117-2 of the control portion 117 judges whether there has been input of a registration signal due to operation of the device link registration switch 118 in the wireless communication device; if there has been input, in step S7 the existence notification count portion 117-3 of the control portion 117 shown in FIG. 11 sets the number of transmissions of an existence notification, and in step S8 the registration information reception time setting portion 117-4 of the control portion 117 shown in FIG. 11 sets the registration information reception time, and receives the registration information.

Then, in step S9 a judgment is made as to whether existence notification has been received from other wireless communication devices, and if existence notification has been received, in step S10 this information is obtained. Specifically, as shown in FIG. 13, the information exchange portion 117-2 of the control portion 117 of the #2 wireless communication device 12 receives an existence notification/ registration request C3 from the #1 wireless communication device 11 before the registration information reception time T2 set by the registration information reception time setting portion 117-4 has elapsed, and the information exchange portion 117-2 of the control portion 117 of the #1 wireless communication device 11 receives a registration request C4 from the #2 wireless communication device 12 before the registration information reception time T3 set by the registration information reception time setting portion 117-4 has elapsed.

Then, in step S11 a judgment is made as to whether the registration information reception time has elapsed, and if the time has not elapsed, operation returns to step S9 and reception processing is continued. Specifically, as shown in FIG. 13, the information exchange portion 117-2 of the control portion 117 of the #2 wireless communication device 12 judges whether the registration information reception time T2 set by the registration information reception time setting portion 117-4 has elapsed, and the information exchange portion 117-2 of the control portion 117 of the #1 wireless communication device 11 judges whether the registration information reception time T3 set by the registration information reception time setting portion 117-4 has elapsed.

If in step S11 the registration information reception time has elapsed, in step S12 a judgment is made as to whether information has been received from another wireless communication device; if not, in step S13 a judgment is made as to whether the existence notification transmission count has been exceeded, and if exceeded, processing ends. Specifically, as shown in FIG. 14, the information exchange portion 117-2 of the control portion 117 of the #1 wireless communication device 11 to which a registration signal C11 is input through operation of the registration switch 118 of the #1 wireless communication device 11 transmits a #1 wireless communication device 11 existence notification/registration request C12 after the registration information reception time T11 set by the registration information reception time setting portion 117-4 has elapsed; after the registration information reception time T12 set by the registration information reception time setting portion 117-4 has elapsed, transmits a #1 wireless communication device 11 existence notification/ registration request C13; after the registration information reception time T13 set by the registration information reception time setting portion 117-4 has elapsed, transmits a #1 wireless communication device 11 existence notification/ registration request C14 . . . ; and in similar manner, existence notification/registration requests C1n have been transmitted a predetermined number of times set by the existence notification count portion 117-3; however, since there is no response from the other wireless communication device, transition to the series of device link registration operations shown in FIG. 13 does not occur.

If in step S13 the existence notification transmission count has not been exceeded, in step S14 existence notification is transmitted, in step S15 the existence notification transmission count is reduced, and in order to continue the sequence, operation returns to step S8. Specifically, as shown in FIG. 14, after the registration information reception time T11 set by the registration information reception time setting portion 117-4 has elapsed, the information exchange portion 117-2 of the control portion 117 of the #1 wireless communication device 11, to which a registration signal C11 due to operation of the registration switch 118 of the #1 wireless communication device 11 has been input, transmits a #1 wireless communication device 11 existence notification/registration request C12; after the registration information reception time T12 set by the registration information reception time setting portion 117-4 has elapsed, transmits a #1 wireless communication device 11 existence notification/registration request C13; after the registration information reception time T13 set by the registration information reception time setting portion 117-4 has elapsed, transmits a #1 wireless communication device 11 existence notification/registration request C14 . . . ; and, in similar manner, the existence notification count has been reduced and existence notification/registration requests C1n have been transmitted a predetermined number of times set by the existence notification count portion 117-3, and reception processing to await a response from another wireless communication device is repeatedly performed.

If in the judgment of step S12 information is received from another wireless communication device, in step S16 a judgment is made as to whether existence notification has been received from another wireless communication device, and if notification is received, in step S17 a judgment is made as to whether there have been a plurality of receptions; if there have been a plurality of receptions, processing is interrupted and is ended. Specifically, as shown in FIG. 15, the information exchange portion 117-2 of the control portion 117 of #1 wireless communication device 11, to which a registration signal C21 due to operation of the registration switch 118 of #1 wireless communication device 11 is input, transmits a #1 wireless communication device 11 existence notification/registration request C22 to the #2 wireless communication device 12 after the registration information reception time T21 set by the registration information reception time setting portion 117-4 has elapsed; if, in response, there are registration requests C23 and C24 from both the #2 wireless communication device 12 and the #3 wireless communication device 13, and a judgment cannot be made as to which device link registration to perform, because there remains the possibility that either the #2 wireless communication device 12 or the #3 wireless communication device 13 is a device not intended by the user, device link registration processing is interrupted.

When, in step S17, existence notification is received from the sole wireless communication device, in step S18 a self-referencing wireless communication device registration request is transmitted to the wireless communication device, and operation returns to step S8 in order to continue the sequence. Specifically, as shown in FIG. 13, the information exchange portion 117-2 of the control portion 117 of #2 wireless communication device 12 receives the existence notification/registration request C3 from the #1 wireless communication device 11 before the registration information reception time T2 set by the registration information reception time setting portion 117-4 elapses, and so transmits a #2 wireless communication device 12 registration request C4 to the #1 wireless communication device 11, and the registration information reception time setting portion 117-4 again sets the registration information reception time T4 to perform reception processing.

If in the judgment of step S16 existence notification is not received, in step S19 a judgment is made as to whether a registration request or registration notification is received; if a registration request or registration notification is received, in step S20 the device link information concerning the communication device is registered, and in step S21 a self-referencing registration notification is transmitted, to end the series of device link registration processing. Specifically, as shown in FIG. 13, the information exchange portion 117-2 of the control portion 117 of #1 wireless communication device 11 receives the registration request C4 from the #2 wireless communication device 12 before the registration information reception time T3 set by the registration information reception time setting portion 117-4 has elapsed, and so the #1 wireless communication device 11 registration notification R1 is transmitted to the #2 wireless communication device 12, the registration information reception time T5 is again set by the registration information reception time setting portion 117-4, and reception processing is performed. Before the registration information reception time T4 set by the registration information reception time setting portion 117-4 has elapsed, the information exchange portion 117-2 of the control portion 117 of #2 wireless communication device 12 receives the existence notification/registration request R1 from the #1 wireless communication device 11, and so the #2 wireless communication device 12 registration notification R2 is transmitted to the #1 wireless communication device 11, and the unidirectional device link setting portion 117-1 of the control portion 117 of #2 wireless communication device 12 sets the device link with the #1 wireless communication device 11. Likewise in the information exchange portion 117-2 of the control portion 117 of the #1 wireless communication device 11, after receiving the #2 wireless communication device 12 registration notification R2, the unidirectional device link setting portion 117-1 of the control portion 117 of the #1 wireless communication device 11 sets a device link with the #2 wireless communication device 12.

As a matter of course, the present invention is not limited to the above-described embodiments, but can take on various other configurations within the scope of the claims thereof.

A wireless communication device of this invention, connected to equipment having a plurality of input/output terminals, includes interface means, which connects equipment having a plurality of input/output terminals; connection information exchange means, which exchanges, with another wireless communication device, information on the equipment connected to each of the input/output terminals; storage means, which stores information on equipment connected to each of the input/output terminals; and information transmission/reception means, which sends and receives information on equipment connected to switched input/output terminals, according to input/output switching operations of equipment having a plurality of input/output terminals; the wireless communication device manages information on equipment connected to each of the input/output terminals in association with other wireless communication devices, and sends and receives information on equipment connected to each of the input/output terminals according to input/output switching of equipment having a plurality of input/output terminals. Hence the information on equipment connected to each of the input/output terminals of equipment having a plurality of input/output terminals is managed in association with other wireless communication devices, so that there is the advantageous result that communication with a plurality of wireless communication devices can be performed according to the input/output switching of equipment.

Also, by means of a wireless communication device including interface functions connected to equipment having a plurality of input/output terminals, wireless communication of information from each equipment unit connected to other wireless communication devices can be realized efficiently.

Consequently there is the advantageous result that a wireless communication system, in which communication intended by a user can be realized according to the input/output switching of equipment, is constructed.

According to the present invention, there are the advantageous results that complicated input selection processing such as is performed in wireless transmissions over conventional wireless LANs is unnecessary, and convenience for the user is improved.

Then, a wireless communication device of this invention further includes, in the above-described device, network formation means for forming a wireless network between other wireless communication devices, and transmission bandwidth reservation means for reserving transmission bandwidth which acquires a predetermined wireless transmission channel for a wireless communication device serving as the control station of the network; the information transmission/reception means sends and receives information in the region in which transmission bandwidth has been reserved, manages information on equipment connected to each of the input/output terminals in association with other wireless communication devices, acquires a predetermined wireless transmission channel to perform wireless communications according to input/output switching of equipment having a plurality of input/output terminals, and transmits and receives information, so that information on equipment connected respectively to the input/output terminals is managed in association with other wireless communication devices, and by acquiring a predetermined wireless transmission channel to perform wireless communication according to input/output switching of equipment, there is the advantageous result that communication is performed only when sending and receiving of information is necessary.

Further, a wireless communication method of this invention, in a wireless communication device connected to equipment having a plurality of input/output terminals, includes an input/output switching step, to switch the input and output of equipment having a plurality of input/output terminals; a utilization notification step, to notify a selected wireless communication device of the utilization of input/output terminals and to request information according to input/output switching; and a transmission step, to transmit information on equipment connected to each of the input/output terminals, according to a request for information in a utilization notification; in this wireless communication method, information on equipment connected to each of the input/output terminals is managed in association with other wireless communication devices, and information on equipment connected to each of the input/output terminals is sent and received according to input/output switching of equipment having a plurality of input/output terminals. Hence there is the advantageous result that, by managing information in association with wireless communication devices connected to each of the input/output terminals of equipment having a plurality of input/output terminals, connection of wireless communication devices to equipment having input/output switching can easily be performed.

In other words, when information is transmitted, information associated in advance can be used, without the need to search for a device.

By means of the above described wireless communication method in which wireless communication devices connected to each input/output terminal of equipment having a plurality of input/output terminals are thus associated and managed, and in which information from connected equipment is sent and received according to input/output switching of equipment, there is the advantageous result that a method of transmitting information without the need for display and input to instruct a connection prior to information communication is obtained.

As a result, there is the advantageous result that wireless communication can be performed between equipment units for which monitor devices and input instruction devices do not exist.

Further, a wireless communication method of this invention, in a wireless communication device connected to equipment having a plurality of input/output terminals, includes an input/output switching step, to switch the input and output of equipment having a plurality of input/output terminals; a bandwidth acquisition request step, to request acquisition of a predetermined wireless transmission channel in order to perform wireless communication according to input/output switching; a bandwidth utilization notification step, to return bandwidth utilization notification in response to a bandwidth acquisition request; an information request step, to request information concerning a selected wireless communication device in response to a bandwidth utilization notification; and a transmission step, to transmit information on equipment connected to each input/output terminal in response to an information request; in this wireless communication method, information is sent and received in a region in which transmission bandwidth is reserved, information on equipment connected to each of the input/output terminals is managed in association with other wireless communication devices, a predetermined wireless transmission channel is acquired for wireless communication, and information is sent and received, according to input/output switching of equipment having a plurality of input/output terminals. Hence there is the advantageous result that, by means of a method of acquiring a predetermined wireless transmission channel in order to perform wireless communication according to input/output switching of equipment having a plurality of input/output terminals, a method can be realized in which wireless communication can be performed when it is necessary to transmit information with a predetermined transmission bandwidth guaranteed, so that, for example, a wireless transmission channel can be acquired even from the communication device which is to serve as the recipient of information.

Further, by sending and receiving information concerning a wireless communication device connected to an input/output terminal according to input/output switching operations, there is the advantageous result that a wireless communication method, which easily realizes the communication intended by the user, is obtained.

Another advantageous result is the ability to realize wireless communication which guarantees QoS (Quality of Service) by reserving transmission bandwidth to acquire a predetermined wireless transmission channel with respect to the control station wireless communication device of a network, according to the input/output switching operations of equipment having a plurality of input/output terminals.

Further, a wireless communication method of this invention, in the above described method, further includes a registration request step, to request registration from each wireless communication device of each input/output terminal of equipment having a plurality of input/output terminals, and a registration notification step, to return registration notification in response to a registration request; in this method, information on equipment connected to each of the input/output terminals is managed in association with other wireless communication devices, so that there is the advantageous result that, by requesting registration from each wireless communication device of each input/output terminal of equipment having a plurality of input/output terminals, returning registration notification in response to a registration request, and by requesting signals of a selected wireless communication device in response to input/output switching of equipment having a plurality of input/output terminals and receiving information sent in response, a method is realized in which wireless transmission is performed automatically according to input switching.

Further, a wireless communication method of this invention, in a wireless communication device connected to equipment executing an application, includes an input/output information exchange step, to exchange information indicating data input/output relations of equipment executing the same application with other wireless communication devices, and a unidirectional device link setting step, to mutually set unidirectional device link relations with other wireless communication devices connected to equipment executing the same application based on information indicating input/output relations; by exchanging input/output information and mutually registering device link relations with other wireless communication devices connected to equipment executing the same application, there is the advantageous result that unnecessary links between wireless communication devices executing different applications can be excluded.

Further, a wireless communication method of this invention, in a wireless communication device connected to equipment executing an application, includes a registration signal detection step, to detect a registration signal due to operation of a registration switch of another wireless communication device within a predetermined registration information reception time after detecting a registration signal due to operation of a registration switch provided on one wireless communication device; an existence notification step, to notify another wireless communication device of existence information on one wireless communication device after a predetermined registration information reception time has elapsed; and, a registration request exchange step, to exchange and transmit a registration request to the one wireless communication device to mutually register a link relation when another wireless communication device receives existence notification; hence there is the advantageous result that, by operating the registration switch on the other wireless communication device within a predetermined time after the registration switch on one wireless communication device has been operated, through a registration method to mutually register a link relation, link relations can easily be constructed between devices intended by the user.

There is further advantageous result that, when after a predetermined time has elapsed self-referencing existence information is transmitted and the existence information on the other device is received, through a registration method of exchanging registration requests, a device not intended by the user can easily be prevented from being incorporated into the wireless network.

Further, in the registration signal detection step of the above-described wireless communication method of this invention, when a registration signal due to operation of a registration switch of another wireless communication device is not detected within a predetermined registration reception time after detecting a registration signal due to operation of a registration switch provided on one wireless communication device, in existence notification step another wireless communication device is notified of existence information concerning one wireless communication device a predetermined number of times after a fixed registration information reception time has lapsed; on the other hand, when there is no response from another wireless communication device, link relation registration is not performed, so that when response from another wireless communication device is not received after transmitting existence notification/registration request a predetermined number of times, a series of registration operation is not performed. Hence, device link registration from a wireless communication device is not performed unless registration request is received from the wireless communication device, device link registration of which is intended by a user, so that device link registration of a wireless communication device not intended by the user can not be performed, obtaining the advantageous result of operation in which device link is not made with the ill-intended third-party device. Furthermore, registration is interrupted when abnormality has occurred in the sequence, so that incorporation of a device not intended by a user into a wireless communication network can be efficiently prevented.

Further, in the registration signal detection step of the above-described wireless communication method of this invention, when a plurality of registration signals are detected due to operation of registration switches of a plurality of other wireless communication devices within a predetermined registration information reception time after detecting a registration signal due to operation of a registration switch provided on one wireless communication device, subsequent processing is not performed, and so a wireless communication device existence notification/registration request is transmitted to other wireless communication devices; however when there are a plurality of registration request responses from a plurality of other wireless communication devices and it is impossible to judge which device link to register, there remains the possibility that one of the plurality of wireless communication devices may be a device not intended by the user, and so the device link registration processing is interrupted. In such a case in which the intention of the user is unclear, by not performing device link registration for a wireless communication device, there is the advantageous result that even if an ill-intended third party device attempts to complete a connection by taking advantage of a device link between two devices specified by the user, this operation is avoided.

Further, the above-described wireless communication method of this invention includes a registration notification step to mutually perform registration notification of link relation registration, so that when registration notification is encoded, encoding information is exchanged, and application information is transmitted, data encoded according to the encoding information is transmitted; hence there is the advantageous result that by exchanging predetermined encoding information with another wireless communication device connected to equipment executing the same application, a method can be obtained in which unnecessary wireless communication with another wireless communication device executing a different application is not performed.

Further, in the above-described wireless communication method of this invention, there is the advantageous result that when encoding information is exchanged while explicitly stating the data input/output relations of equipment executing the same application and information on application is transmitted, data encoded according to the encoding information is transmitted, so that by exchanging predetermined encoding information with another wireless communication device connected to equipment executing the same application while explicitly stating the data input/output relations, on transmitting information on application, a wireless communication method for transmitting encoded data based on data input/output relations can be realized.

Further, by means of a wireless communication method including a function of exchanging predetermined encoding information and an information transmission/reception function of transmitting encoded data according to the above encoding information, there is the advantageous result that connection links not intended by the user, as well as unnecessary dissemination of content to the outside of the network using a connection link with other than the predetermined data direction, can be prevented.

Further, a wireless communication device of this invention, which is connected to equipment executing an application and performs wireless communication with other wireless communication devices, includes equipment-specific information detection means, for detecting equipment-specific information indicating the data input/output relation of equipment executing the same application, and unidirectional device link setting means, for mutually setting unidirectional device link relations with another wireless communication device connected to equipment executing the same application based on equipment-specific information; hence by including a function of completing unidirectional link relations based on equipment-specific information with another wireless communication device executing the same application, there is the advantageous result that a wireless communication device is obtained, in which necessary wireless links can be constructed according to the user's intention, and connection links not intended by the user can be excluded.

Furthermore, the above-described wireless communication device of this invention further includes information exchange means for exchanging information with another wireless communication device, and equipment-specific information on equipment connected to the other wireless communication device is exchanged; hence there is the advantageous result that a wireless communication device is obtained, in which necessary wireless links can be constructed through a data input/output interface based on equipment-specific information on equipment connected to the other wireless communication device, and a connection link with other than the predetermined data direction can be excluded.

Further, a wireless communication system of this invention, which performs wireless communication among wireless communication devices connected to equipment executing an application, includes a wireless communication device which mutually sets input or output unidirectional device link relations with another wireless communication device connected to equipment executing the same application, based on information indicating a data input or output relation of equipment executing the same application, and another wireless communication device which mutually sets output or input unidirectional device link relations with a wireless communication device connected to equipment executing the same application as the application, based on information indicating a data output or input relation of equipment executing the same application as the application; hence there is the advantageous result that, by mutually registering device links with another wireless communication device while explicitly stating data input/output relations of equipment connected to a wireless communication device, unnecessary-direction links in conventional wireless networks can be excluded, and consumer equipment can be incorporated efficiently into wireless networks.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A wireless communication device, connected to an equipment having a plurality of input/output terminals, comprising:

interface means for connecting to the equipment having a plurality of input/output terminals;

connection information exchange means for exchanging information on an equipment connected to each input/output terminal, with other wireless communication devices;

storage means for storing information on the equipment connected to each input/output terminal;

information transmission/reception means for transmitting and receiving information on the equipment connected to input/output terminals which are switched according to the input/output switching operation of said equipment having a plurality of input/output terminals;

network formation means for forming a wireless network with the other wireless communication devices; and transmission bandwidth reservation means for acquiring a predetermined wireless transmission channel and reserving transmission bandwidth with respect to a wireless communication device serving as a control station of the network according to input/output switching operations of said equipment having a plurality of input/output terminals, wherein said information transmission/reception means transmits and receives information in a region in which said transmission bandwidth reservation is performed, manages information on the equipment connected to each of said input/output terminals in association with the other wireless communication devices, and acquires the predetermined wireless transmission channel to perform wireless communication and then transmits and receives information according to input/output switching of said equipment having a plurality of input/output terminals.

2. A wireless communication device according to claim 1, wherein information on the equipment connected to each of said input/output terminals is managed in association with the other wireless communication devices, and information on the equipment connected to each input/output terminal is transmitted and received according to the input/output switching of said equipment having a plurality of input/output terminals.

3. A wireless communication method, in a wireless communication device connected to an equipment having a plurality of input/output terminals, comprising the steps of:
switching input/output of said equipment having a plurality of input/output terminals;
requesting bandwidth acquisition in which a predetermined wireless transmission channel is acquired to perform wireless communication according to said input/output switching;
returning bandwidth utilization notification in response to said bandwidth acquisition request;
requesting information from a selected wireless communication device according to said bandwidth utilization notification; and
transmitting information on an equipment connected to an input/output terminal in response to said request of information, wherein
information is transmitted and received in a region in which said transmission bandwidth reservation is performed, information on equipment connected to each of said input/output terminals is managed in association with other wireless communication devices, according to the input/output switching of said equipment having a plurality of input/output terminals, a predetermined wireless transmission channel is acquired to perform wireless communication, and information is transmitted and received.

4. The wireless communication method according to claim 3, further comprising the steps of:
requesting each input/output terminal of said equipment having a plurality of input/output terminals to perform registration from each wireless communication device, and
returning registration notification in response to said registration request, wherein
information on the equipment connected to each of said input/output terminals is managed in association with other wireless communication devices.

5. A wireless communication method, in a first wireless communication device connected to an equipment executing an application, comprising the steps of:
detecting a registration signal caused by operation of a registration switch of a second wireless communication device within a predetermined registration information reception time after detecting a registration signal caused by operation of a registration switch provided on the first wireless communication device;
notifying the second wireless communication device of existence information concerning the first wireless communication device after said predetermined registration information reception time has elapsed; and
exchanging a registration request that mutually registers link relations with the first wireless communication device and transmitting the request, when said existence notification is received by the second wireless communication device, wherein
when in said registration signal detection step a registration signal caused by operation of the registration switch of the second wireless communication device is not detected within the predetermined registration information reception time after detecting a registration signal caused by operation of a registration switch provided on the first wireless communication device, and
in said existence notification step, link relation registration is not performed.

6. A wireless communication method according to claim 5, wherein
in said registration signal detection step, when a plurality of registration signals caused by operation of registration switches of a plurality of other wireless communication devices are detected within a predetermined registration information reception time after detecting a registration signal caused by operation of a registration switch provided on one wireless communication device, subsequent processing is not performed.

7. A wireless communication method according to claim 5, further comprising the step of mutually notifying registration with respect to the registration of said link relations, wherein
when said registration notification is encoded, encoding information is exchanged, and application information is transmitted, data encoded according to said encoding information is transmitted.

8. A wireless communication method according to claim 7, wherein
when said encoding information is exchanged while explicitly stating data input/output relations of equipment executing the same application as said application and application information is transmitted, data encoded according to said encoding information is transmitted.

9. A wireless communication method, in a wireless communication device connected to an equipment executing an application, comprising the steps of:
detecting a registration signal caused by operation of a registration switch of a second wireless communication device within a predetermined registration information reception time after detecting a registration signal caused by operation of a registration switch provided on the first wireless communication device;
notifying the second wireless communication device of existence information concerning the first wireless communication device after said predetermined registration information reception time has elapsed; and
exchanging a registration request that mutually registers link relations with the first wireless communication device and transmitting the request, when said existence notification is received by the second wireless communication device, wherein
when in said registration signal detection step a registration signal caused by operation of the registration switch of the second wireless communication device is not detected within the predetermined registration information reception time after detecting the registration signal caused by operation of the registration switch provided on the first wireless communication device,
in said existence notification step the second wireless communication device is notified a predetermined number of times of existence information concerning the first wireless communication device after said predetermined registration information reception time has elapsed; and
if there is no response from the second wireless communication device, link relation registration is not performed.

10. A wireless communication device, connected to a main equipment having a plurality of input/output terminals, comprising:

- interface means for connecting each input/output terminals of said main equipment;
- control signal acquisition means for acquiring a control signal representing an input/output switching operation of said main equipment;
- connection information exchange means for exchanging connection information corresponding to peripheral equipments which transmit/receive the signal inputted/outputted to each input/output terminal, with other wireless communication devices;
- storage means for storing said connection information on the peripheral equipments; and
- communication means for communicating with said peripheral via said other wireless communication device, wherein
- when said control signal acquisition means acquires said control signal, said communication means communicates with said peripheral equipment corresponding to the control signal by using said connection information, and
- said interface means interfaces the signal which is inputted/outputted between said communication means and the input/output terminal selected by the control signal.

* * * * *